(12) United States Patent
Kobayashi

(10) Patent No.: US 7,487,273 B2
(45) Date of Patent: Feb. 3, 2009

(54) DATA PACKET BASED STREAM TRANSPORT SCHEDULER WHEREIN TRANSPORT DATA LINK DOES NOT INCLUDE A CLOCK LINE

(75) Inventor: Osamu Kobayashi, Los Altos, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 1002 days.

(21) Appl. No.: 10/909,085

(22) Filed: Jul. 29, 2004

(65) Prior Publication Data
US 2005/0066085 A1   Mar. 24, 2005

Related U.S. Application Data

(60) Provisional application No. 60/552,352, filed on Mar. 10, 2004, provisional application No. 60/504,060, filed on Sep. 18, 2003.

(51) Int. Cl.
*G06F 13/12* (2006.01)
*G06F 13/38* (2006.01)

(52) U.S. Cl. ............. 710/62; 710/34; 710/305; 370/438; 370/522; 345/96; 345/100

(58) Field of Classification Search ........... 710/34, 710/62, 305; 370/522, 438; 345/98, 100
See application file for complete search history.

(56) References Cited

U.S. PATENT DOCUMENTS

| | | | |
|---|---|---|---|
| 4,796,203 A | 1/1989 | Roberts | |
| 5,541,919 A | 7/1996 | Yong et al. | |
| 5,608,418 A | 3/1997 | McNally | |
| 5,615,376 A | 3/1997 | Ranganathan | |
| 5,625,379 A | 4/1997 | Reinert et al. | |
| 5,629,715 A | 5/1997 | Zenda | |
| 5,739,803 A | 4/1998 | Neugebauer | |
| 5,745,837 A | 4/1998 | Fuhrmann | |
| 5,790,083 A | 8/1998 | Bassetti | |
| 5,805,173 A | 9/1998 | Glennon et al. | |
| 5,838,875 A | 11/1998 | Cho et al. | |

(Continued)

FOREIGN PATENT DOCUMENTS

EP    0 354 480 A    2/1990

(Continued)

OTHER PUBLICATIONS

International Search Report in related Chinese Application No. 200410044503.5 dated Jun. 29, 2007.

(Continued)

*Primary Examiner*—Tammara Peyton
(74) *Attorney, Agent, or Firm*—Beyer Law Group LLP

(57) ABSTRACT

A method of coupling a multimedia source device to a multimedia sink device by providing a source device having a transmitter unit coupled thereto, providing sink device having a receiver unit coupled thereto, receiving a source data stream in accordance with a native stream rate by the transmitter unit, coupling the transmitter unit and the receiver unit by way of a linking unit, forming a multimedia data packet stream formed of a number of multimedia data packets and generating a transport schedule for transferring the multimedia data packet stream in accordance with a link rate between the transmitter unit and the receiver unit wherein the multimedia data.

18 Claims, 40 Drawing Sheets

U.S. PATENT DOCUMENTS

| | | | |
|---|---|---|---|
| 5,852,630 A | 12/1998 | Langberg et al. | |
| 5,909,465 A | 6/1999 | Bottomley et al. | |
| 5,918,002 A | 6/1999 | Klemets et al. | |
| 5,926,155 A | 7/1999 | Arai et al. | |
| 5,940,137 A | 8/1999 | Hulvey | |
| 5,949,437 A | 9/1999 | Clark | |
| 6,020,901 A | 2/2000 | Lavelle et al. | |
| 6,038,000 A | 3/2000 | Hurst, Jr. | |
| 6,069,929 A * | 5/2000 | Yabe et al. | 375/368 |
| 6,151,334 A | 11/2000 | Kim et al. | |
| 6,151,632 A | 11/2000 | Chaddha et al. | |
| 6,154,225 A | 11/2000 | Kou et al. | |
| 6,175,573 B1 | 1/2001 | Togo et al. | |
| 6,223,089 B1 | 4/2001 | Page | |
| 6,249,319 B1 | 6/2001 | Post | |
| 6,326,961 B1 | 12/2001 | Lin et al. | |
| 6,337,964 B2 | 1/2002 | Inami et al. | |
| 6,353,594 B1 | 3/2002 | Tooker et al. | |
| 6,356,260 B1 | 3/2002 | Montalbo | |
| 6,437,768 B1 | 8/2002 | Kubota et al. | |
| 6,446,130 B1 | 9/2002 | Grapes | |
| 6,477,252 B1 | 11/2002 | Faber et al. | |
| 6,577,303 B2 | 6/2003 | Kim | |
| 6,587,480 B1 | 7/2003 | Higgins et al. | |
| 6,598,161 B1 | 7/2003 | Kluttz et al. | |
| 6,608,828 B1 | 8/2003 | Balachandran | |
| 6,614,800 B1 | 9/2003 | Genty et al. | |
| 6,661,422 B1 | 12/2003 | Valmiki et al. | |
| 6,697,376 B1 | 2/2004 | Son et al. | |
| 6,765,931 B1 | 7/2004 | Rabenko et al. | |
| 6,865,188 B1 | 3/2005 | Stirling et al. | |
| 6,909,442 B2 * | 6/2005 | Hiyama et al. | 345/690 |
| 6,914,637 B1 | 7/2005 | Wolf et al. | |
| 6,963,968 B2 | 11/2005 | Kori | |
| 7,075,987 B2 | 7/2006 | Kim et al. | |
| 2001/0030649 A1 | 10/2001 | Mamiya et al. | |
| 2001/0038387 A1 | 11/2001 | Tomooka et al. | |
| 2002/0007452 A1 | 1/2002 | Traw et al. | |
| 2002/0011996 A1 | 1/2002 | Inoue et al. | |
| 2002/0062394 A1 | 5/2002 | Bunn et al. | |
| 2002/0071390 A1 | 6/2002 | Reeves et al. | |
| 2002/0075902 A1 | 6/2002 | Abbas et al. | |
| 2002/0085582 A1 | 7/2002 | Kim | |
| 2002/0089517 A1 | 7/2002 | Ludtke et al. | |
| 2002/0122515 A1 | 9/2002 | Bodenschatz | |
| 2002/0136219 A1 | 9/2002 | Ding et al. | |
| 2002/0149617 A1 | 10/2002 | Becker | |
| 2002/0163598 A1 | 11/2002 | Pasqualino | |
| 2002/0164022 A1 | 11/2002 | Strasser et al. | |
| 2002/0190974 A1 | 12/2002 | Morita | |
| 2002/0190978 A1 | 12/2002 | Agarwal et al. | |
| 2003/0048852 A1 | 3/2003 | Hwang et al. | |
| 2003/0063077 A1 | 4/2003 | Koyama | |
| 2003/0076282 A1 | 4/2003 | Ikeda et al. | |
| 2003/0080971 A1 | 5/2003 | Hochmuth et al. | |
| 2003/0112822 A1 | 6/2003 | Hong et al. | |
| 2003/0145258 A1 | 7/2003 | Warner et al. | |
| 2003/0149987 A1 | 8/2003 | Pasqualino et al. | |
| 2003/0152160 A1 | 8/2003 | Bauch et al. | |
| 2003/0174156 A1 | 9/2003 | Katsuhara et al. | |
| 2003/0212811 A1 | 11/2003 | Thornton | |
| 2004/0049705 A1 | 3/2004 | Liebenow | |
| 2004/0080671 A1 | 4/2004 | Siemens et al. | |
| 2004/0088469 A1 | 5/2004 | Levy | |
| 2004/0103333 A1 | 5/2004 | Martwick et al. | |
| 2004/0114607 A1 * | 6/2004 | Shay et al. | 370/395.42 |
| 2004/0210805 A1 | 10/2004 | Kimelman et al. | |
| 2004/0218598 A1 | 11/2004 | Kobayashi | |
| 2004/0218599 A1 | 11/2004 | Kobayashi | |
| 2004/0218624 A1 | 11/2004 | Kobayashi | |
| 2004/0218625 A1 | 11/2004 | Kobayashi | |
| 2004/0218627 A1 | 11/2004 | Kobayashi | |
| 2004/0221056 A1 | 11/2004 | Kobayashi | |
| 2004/0221312 A1 | 11/2004 | Kobayashi | |
| 2004/0221315 A1 | 11/2004 | Kobayashi | |
| 2004/0228365 A1 | 11/2004 | Kobayashi | |
| 2004/0233181 A1 | 11/2004 | Kobayashi | |
| 2004/0243905 A1 | 12/2004 | Merritt | |
| 2005/0062699 A1 | 3/2005 | Kobayashi | |
| 2005/0062711 A1 | 3/2005 | Kobayashi | |
| 2005/0103333 A1 | 5/2005 | Bonutti | |
| 2007/0140298 A1 | 6/2007 | Eng | |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 517 292 A2 | 3/2005 |
| EP | 1 519 349 A2 | 3/2005 |
| EP | 1 519 581 A1 | 3/2005 |
| GB | 2 329 741 A | 3/1999 |
| JP | 03-153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | 95/13681 | 5/1995 |
| WO | WO 98/41008 | 9/1998 |
| WO | WO 99/63513 | 12/1999 |
| WO | WO00/20974 | 4/2000 |
| WO | 02/25822 A2 | 3/2002 |
| WO | WO 03/058376 | 7/2003 |

OTHER PUBLICATIONS

High-bandwidth Digital Content Protection System, Revision 1.0, Intel Corporation, Feb. 17, 2000.

EPO Exam Report in EP Application No. 04255786.8 dated Jul. 5, 2007.

Office Action mailed Jun. 26, 2007 from U.S. Appl. No. 10/762,680.

"CLUT," http://en.wikipedia.org/wiki/CLUT.

"Packet," http://en.wikipedia.org/wiki/Packet.

Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.

Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.

International Search Report dated Oct. 12, 2005 from Singapore Patent Application No. 200405115-7.

U.S. Office Action mailed Aug. 9, 2005 from U.S. Appl. No. 10/726,438.

U.S. Office Action mailed Aug. 9, 2005 from U.S. Appl. No. 10/727,131.

U.S. Office Action mailed Aug. 5, 2005 from U.S. Appl. No. 10/726,934.

Examination Report dated Mar. 15, 206 from European Patent Application No. 04255610.0.

Final Rejection mailed Sep. 21, 2007 from U.S. Appl. No. 10/909,103.

Notice of Allowance mailed Sep. 24, 2007 from U.S. Appl. No. 10/726,802.

Supplemental Notice of Allowance mailed Nov. 6, 2007 from U.S. Appl. No. 10/726,802.
Office Action mailed Nov. 27, 2007 from U.S. Appl. No. 10/726,794.
Examination/Search Report dated Mar. 1, 2006 from related Singapore Patent Application No. 200402057-4.
Chang et al., "Digital Visual Interface," Technology Brief, Dell, May 2000.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from related European Patent Application No. 04255609.2.
Office Action mailed Dec. 5, 2006 from U.S. Appl. No. 10/726,802.
Office Action mailed Jul. 9, 2007 from related U.S. Appl. No. 10/726,895.
Chinese Office Action dated Apr. 4, 2008 in Chinese Application No. 200410047784.X.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Office Action dated Jun. 23, 2008 from U.S. Appl. No. 10/762,680.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 24, 2008 from U.S. Appl. No. 10/726,794.
Chinese Office Action dated Jul. 18, 2008 from Chinese Patent Application No. 200410038432.8.

* cited by examiner

Main Link Data Rates

| Nominal Baud Rate per channel (Gbits/second) | Actual Baud Rate per channel (Gbits/second) | Clock Multiplication Factor from 24-MHz crystal |
|---|---|---|
| 1.0 | 0.960 | x40 |
| 1.35 | 1.344 | x56 |
| 1.7 | 1.728 | x72 |
| 2.1 | 2.112 | x88 |
| 2.5 | 2.496 | x104 |

Fig. 3

Main Link Packet Format

High-level diagram of link traffic example with three streams n = null

| SID = 1 | 0 | 0 | 0 | 0 | CRC | TSP19-16 | PHI |
|---|---|---|---|---|---|---|---|
| Sub-packet Header 902 | | | | | | Sub-packet Header 902 | SPS 904 |
| Sub-packet Payload | | | | | | | |
| SID = 1 | 1 | 0 | 0 | 0 | CRC | TSP3-0 | PHI |
| Packet Payload for SID 1 | | | | | | | |

Fig. 9A

| Phase | Transmitted Link Characters | Binary pattern |
|---|---|---|
| 1 | D10.2 | 0101010101 0101010101 0101010101 0101010101 0101010101 |
| 2 | K28.7 | 0011111000 0011111000 0011111000 0011111000 0011111000 |
| 3 | K28.5, and three D10.2 | 0011111010 0101010101 0101010101 0101010101 1100000101 |

Main Link Training Pattern

Fig. 11

8B/10B Special Characters Usage

| Encoding | Name | Description |
|---|---|---|
| K28.5 | Comma (COM) | Inserted between packets. Also used as part of Test Pattern |
| K28.7 | TrainingPattern (TPN) | Sent during Training Pattern transmission for bit/byte clock lock. |
| K23.7 | Null (NUL) | Sent within the packet period when there is no data to transmit. |
| K28.2 | Sub-packet Start (SPS) | Indicate a start of sub-packet inserted in a packet |
| K29.7 | Sub-packet End (SPE) | Indicate an end of sub-packet inserted in a main packet. |
| K28.0 | PacketHeaderIndicator (PHI) | Sent along with 16 bits of header for header identification. |
| K28.1 | | Reserved |
| K28.3 | | Reserved |
| K28.4 | | Reserved |
| K28.6 | | Reserved |
| K25.7 | | Reserved |
| K27.7 | | Reserved |

Fig. 20

PCI EXPRESS MOTHERBOARD WITH DEDICATED DD-EXPRESS CONNECTOR

PCI Express motherboard with passive connector card.

PCI Express motherboard with add-in DD-Express graphics card

Legacy graphics accelerator bus
transmitter mounted on a legacy bus card slot converts
digital raster data/timing signals into main link streams

DATA PACKET BASED STREAM TRANSPORT SCHEDULER WHEREIN TRANSPORT DATA LINK DOES NOT INCLUDE A CLOCK LINE

CROSS REFERENCE TO RELATED APPLICATIONS

This patent application takes priority under 35 U.S.C. 119 (e) to (i) U.S. Provisional Patent Application No. 60/504,060 filed on Sep. 18, 2003, entitled "DIGITAL/ANALOG VIDEO INTERCONNECT AND METHODS OF USE THEREOF" by Kobayashi, and (ii) U.S. Provisional Patent Application No. 60/552,352 filed on Mar. 10, 2004, entitled "DATA STREAM TRANSPORT SCHEDULING AND DATA STREAM CLOCK RECOVERY APPARATUS AND METHODS OF USE THEREOF" by Kobayashi each of which are hereby incorporated by reference herein in their entirety. This application is also related to the following co-pending U.S. Patent applications each of which are incorporated by reference, (i) U.S. patent application Ser. No. 10/726,802, entitled "METHOD OF ADAPTIVELY CONNECTING A VIDEO SOURCE AND A VIDEO DISPLAY" naming Kobayashi as inventor; (ii) U.S. patent application Ser. No. 10/726,438, entitled "METHOD AND APPARATUS FOR EFFICIENT TRANSMISSION OF MULTIMEDIA DATA PACKETS" naming Kobayashi as inventor; (iii) U.S. patent application Ser. No. 10/726,440, entitled "METHOD OF OPTIMIZING MULTIMEDIA PACKET TRANSMISSION RATE", naming Kobayashi as inventor; (iv) U.S. patent application Ser. No. 10/727,131, entitled "USING AN AUXILARY CHANNEL FOR VIDEO MONITOR TRAINING", naming Kobayashi as inventor; (v) U.S. patent application Ser. No. 10/726,350, entitled "TECHNIQUES FOR REDUCING MULTIMEDIA DATA PACKET OVERHEAD", naming Kobayashi as inventor; (vi) U.S. patent application Ser. No. 10/726,362, entitled "PACKET BASED CLOSED LOOP VIDEO DISPLAY INTERFACE WITH PERIODIC STATUS CHECKS", naming Kobayashi as inventor; (vii) U.S. patent application Ser. No. 10/726,895, entitled "MINIMIZING BUFFER REQUIREMENTS IN A DIGITAL VIDEO SYSTEM", naming Kobayashi as inventor; and (viii) U.S. patent application Ser. No. 10/726,441, entitled "VIDEO INTERFACE ARRANGED TO PROVIDE PIXEL DATA INDEPENDENT OF A LINK CHARACTER CLOCK", naming Kobayashi as inventor; (ix) U.S. patent application Ser. No. 10/726,934, entitled "ENUMERATION METHOD FOR THE LINK CLOCK RATE AND THE PIXEL/AUDIO CLOCK RATE", naming Kobayashi as inventor, and (x) U.S. patent application Ser. No. 10/726,794, entitled "PACKET BASED VIDEO DISPLAY INTERFACE AND METHODS OF USE THEREOF" naming Kobayashi as inventor.

FIELD OF THE INVENTION

The invention relates to multimedia devices. More specifically, the invention describes a data packet stream scheduler and methods of use thereof.

BACKGROUND OF THE INVENTION

Raster scan video transport protocols were originally developed for use with cathode ray tube (CRT) based display systems that must take into account the fact that an electron gun(s) is used to physically "paint" the displayed image one line at a time. For example, a standard definition (VGA) video image is formed of an active region that nominally includes 480 active display lines each of which is formed of 640 pixels (i.e., 640×480 resolution). In addition to the active region, however, a blanking region that is not displayed but nonetheless is included in the video signal since it represents that amount of time that is required for both horizontal and vertical retrace. For example, each frame of a VGA image (i.e., one full frame being 480 lines of 640 pixels each) requires approximately 160 pixel clocks per line for horizontal retrace and a period of time equal to approximately 45 line periods for vertical retrace. In this way (assuming one pixel per pixel clock) the video signal required to transport the video data necessary to display the VGA image must be on the order to 800 pixel clocks (640 active pixel clocks+160 blanking pixel clocks). Therefore, the transport efficiency (as defined as the bandwidth of the displayable data over the total data stream bandwidth) is on the order of 80% (i.e., 640/800).

More recently, as the resolution of CRTs has increased in order to accommodate HDTV and other high end graphics applications, the efficiency of raster scan video transport protocols have been increased to approximately 90% by requiring that the horizontal retrace be limited to 160 pixel clocks (thereby reducing the associated blanking period). For example, given a UVGA image (i.e., 1600×1200), the transport efficiency is approximately 90% when the horizontal retrace is maintained at 160 pixel clocks (1600/(1600+160)) Although raster scan video transfer protocols are efficient (on the order of 90%) and do not require large buffers, they are, however, inflexible in that it is essentially capable of only displaying data as it is rendered.

In addition to raster scan video transport protocols, the emergence of digital video based systems has created the need for digital video transport protocols. One such digital video transport protocol referred to I.E.E.E. 1394, or FireWire™ is based upon isochronous packet transport that relies upon a large buffer (on the order of 60 Kb) in order to guarantee a uniform bit rate and maintain synchronicity between multiple data streams (such as a video stream and an associated soundtrack in the form of an audio stream). Although isochronous packet transfer protocols are inherently flexible (due to their packet based nature), the large buffer requirements can be very costly.

Therefore, what is desirable is a data stream transport protocol that has the efficiency (in terms of both transport efficiency and memory resource utilization) of the raster scan transfer protocol and the flexibility of the isochronous packet transfer protocol.

SUMMARY OF THE INVENTION

A method of coupling a multimedia source device to a multimedia sink device by providing a source device having a transmitter unit coupled thereto, providing sink device having a receiver unit coupled thereto, receiving a source data stream in accordance with a native stream rate by the transmitter unit, coupling the transmitter unit and the receiver unit by way of a linking unit, forming a multimedia data packet stream formed of a number of multimedia data packets and generating a transport schedule for transferring the multimedia data packet stream in accordance with a link rate between the transmitter unit and the receiver unit wherein the multimedia data packets are each a fixed size based upon the link rate and a data stream bit rate.

A method of scheduling a transport of a number of data packets between a data source and a data sink by way of a data link by sending data packet attributes from the data packet source to the data packet sink, comparing a stream bit rate to a data link bit rate for each of a number of data streams to be sent from the source to the sink, setting a packet size for each of the data streams based upon the comparing wherein the packet size is a fixed packet size, combining at least one of each data packet, and transporting the combined data packets from the source to the sink.

In yet another embodiment, computer program product for scheduling a transport of a number of data packets between a data source and a data sink by way of a data link that includes computer code for sending data packet attributes from the data packet source to the data packet sink, computer code for comparing a stream bit rate to a data link bit rate for each of a number of data streams to be sent from the source to the sink, computer code for setting a packet size for each of the data streams based upon the comparing wherein the packet size is a fixed packet size, computer code for combining at least one of each data packet, computer code for transporting the combined data packets from the source to the sink, and computer readable medium for storing the code.

BRIEF DESCRIPTION OF THE DRAWINGS

FIG. 3 shows exemplary main link rates in accordance with an embodiment of the invention.

FIG. 9A shows a representative sub-packet in accordance with an embodiment of the invention.

FIG. 11 shows an exemplary link training pattern in accordance with an embodiment of the invention.

FIG. 20 shows an exemplary special character mapping using 8B/10B in accordance with an embodiment of the invention.

DETAILED DESCRIPTION OF SELECTED EMBODIMENTS

Figure 1:
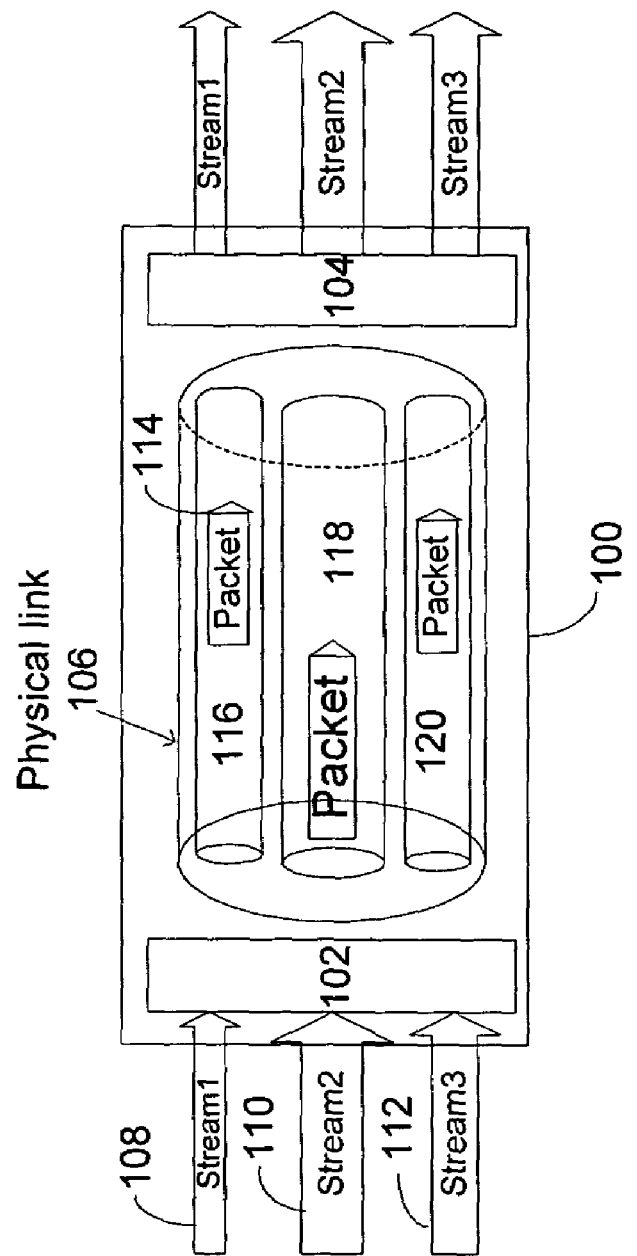
FIG. 1 shows a generalized representation of a cross platform display interface 100 in accordance with an embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The invention will now be described in terms of a video display system having a video source coupled to a video sink, or receiver, by way of a packet based digital interface. A transmitter unit coupled to the source device receives any number of packetized video data streams each having associate stream attributes. In terms of the video system under discussion, such attributes include video format, color depth, etc. The receiver unit is coupled to the source by way of a data, or main link, and an associated auxiliary link used, in part, to transfer the stream attribute data from the source to the receiver prior to the transmission of the data packets by way of the main link. In this way, the packet headers are used to primarily identify which data stream a data packet is associated and therefore can include only a stream ID, or other such identifier. In this way packet overhead is substantially reduced packet overhead preserving main link bandwidth for multimedia content, such as video and audio data providing an efficient packet transport mechanism. In order to co-ordinate the transmission of the data in the main link, a transport stream scheduler provides for a flexible, efficient system, method, and apparatus for scheduling any of a number of packetized data streams over the data link where an auxiliary channel for sending stream attribute data from a source to a sink may also be provided.

Each data stream is formed of a number of associated data packets whose size depends upon the relative portion of link bandwidth required for that particular data stream. For a particular data stream i an associated packet size $PS_i$ is related to a maximum packet size MPS, a link bit rate LBR and a stream bit rate $SBR_i$ by way of the following relationship:

$$PS_i = MPS*SBR^i/(LBR_i+1).$$

In this way, a packet size is determined for each data stream based upon the relative bandwidth of the data stream compared to a data link bandwidth. For example, in the case where the maximum packet size is 64 link symbols, and the link bit rate LBR is 2.5 Gbps per lane Table 1 shows reprehensive packet sizes corresponding to selected stream bit rates

TABLE 1

| Link Bit Rate (LBR) | Stream Bit Rate (SBR) | Packet Size (PS) |
|---|---|---|
| 2.5 Gbps/lane | 1.0 Gbps/lane | 32 link symbols |
| 2.5 Gbps/lane | 0.3125 Gbps/lane | 10 link symbols |
| 2.5 Gbps/lane | 0.25 Gbps/lane | 8 link symbols |
| InterLaneAlignment (ILA) | | 2 link symbols |

The scheduler time division multiplexes (at the transmitter) and de-multiplexes (at the receiver) the packets of the multiple streams into a corresponding link data stream. In the described embodiment, the transmitter reads the capability of the receiver in terms of, for example, the maximum data link rate, the available buffer size and the number of time base recovery (TBR) units. With this knowledge, the transmitter is able to determine the most efficient transport configuration and whether or not subsequent data streams can be accommodated by the receiver all without the need to send additional inquiries to the receiver. Prior to commencing the data stream transport, the transmitter notifies the receiver of stream attributes such as in the case of video data, color format and depth, geometry as well as the packet size associated with each data stream. By communicating this attribute data, the size of the packet headers can be substantially reduced to the point where only a stream ID is required. In this way, the transport efficiency is greatly increased over that provided in conventional packet based transport protocols that require substantially more overhead due to the larger size of the packet headers.

In order to provide a basis for the discussion of the inventive stream scheduler, a representative digital video system is described well suited for implementation of the invention.

Accordingly, FIG. 1 shows a generalized representation of a packet based digital video display interface 100 well suited for implementing any of a number of embodiments of the invention. The interface 100 connects a transmitter 102 to a receiver 104 by way of a physical link 106 (also referred to as a pipe). In the described embodiment, a number of data streams 108-112 are received at the transmitter 102 that, if necessary, packetizes each into a corresponding number of data packets 114. These data packets are then formed into corresponding data streams each of which are passed by way of an associated virtual pipe 116-120 to the receiver 104. It should be noted that the link rate (i.e., the data packet transfer rate) for each virtual link can be optimized for the particular data stream resulting in the physical link 106 carrying data streams each having an associated link rate (each of which could be different from each other depending upon the particular data stream). The data streams 110-114 can take any number of forms such as video, graphic, audio, etc.

Typically, when the source is a video source, the data streams 110-114 include various video signals that can have any number and type of well-known formats, such as composite video, serial digital, parallel digital, RGB, or consumer digital video. The video signal can be an analog video signal provided the source 102 includes some form of an analog video source such as for example, an analog television, still camera, analog VCR, DVD player, camcorder, laser disk player, TV tuner, set top box (with satellite DSS or cable signal) and the like. The source 102 can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the source 102 provides an analog image signal, an analog-to-digital converter (A/D) converts an analog voltage or current signal into a discrete series of digitally encoded numbers (signal) forming in the process an appropriate digital image data word suitable for digital processing. Any of a wide variety of A/D converters can be used. By way of example, other A/D converters include, for example those manufactured by: Philips, Texas Instrument, Analog Devices, Brooktree, and others.

For example, if the data stream 110 is an analog type signal, the an analog to digital converter (not shown) included in or coupled to the transmitter 102 will digitize the analog data which is then packetize by a packetizer that converts the digitized data stream 110 into a number of data packets 114 each of which will be transmitted to the receiver 104 by way of the virtual link 116. The receiver 104 will then reconstitute the data stream 110 by appropriately recombining the data packets 114 into their original format. It should be noted that the link rate is independent of the native stream rates. The only requirement is that the link bandwidth of the physical link 106 be higher than the aggregate bandwidth of data stream(s) to be transmitted. In the described embodiment, the incoming data (such as pixel data in the case of video data) is packed over the respective virtual link based upon a data mapping definition. In this way, the physical link 106 (or any of the constituent virtual links) does not, as does conventional interconnects such as DVI, carry one pixel data per link character clock.

In this way, the interface 100 provides a scaleable medium for the transport of not only video and graphics data, but also audio and other application data as may be required. In addition, the invention supports hot-plug event detection and automatically sets the physical link (or pipe) to its optimum transmission rate. The invention provides for a low pin count, purely digital display interconnect for all displays suitable for multiple platforms. Such platforms include host to display, laptop/all-in-one as well as HDTV and other consumer electronics applications.

In addition to providing video and graphics data, display timing information can be embedded in the digital stream providing essentially perfect and instant display alignment, obviating the need for features like "Auto-Adjust" and the like. The packet based nature of the inventive interface provides scalability to support multiple, digital data streams such as multiple video/graphics streams and audio streams for multimedia applications. In addition, a universal serial bus (USB) transport for peripheral attachment and display control can be provided without the need for additional cabling.

Other embodiments of the inventive display interface will be discussed below.

Figure 2A:
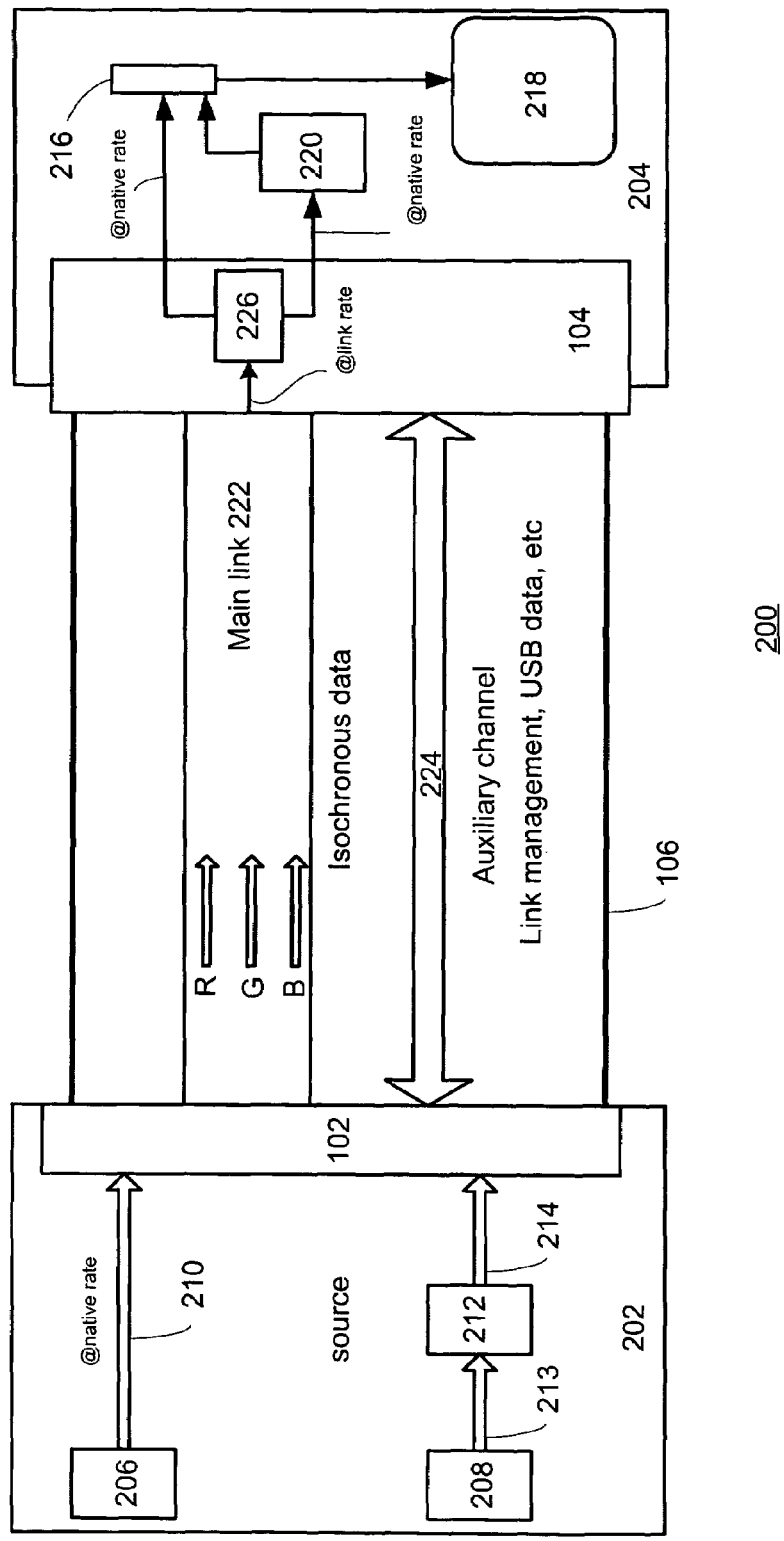
FIGS. 2A-2B illustrates a video interface system that is used to connect a video source and a video display unit in accordance with a number of embodiments of the invention.
Figure 2B:
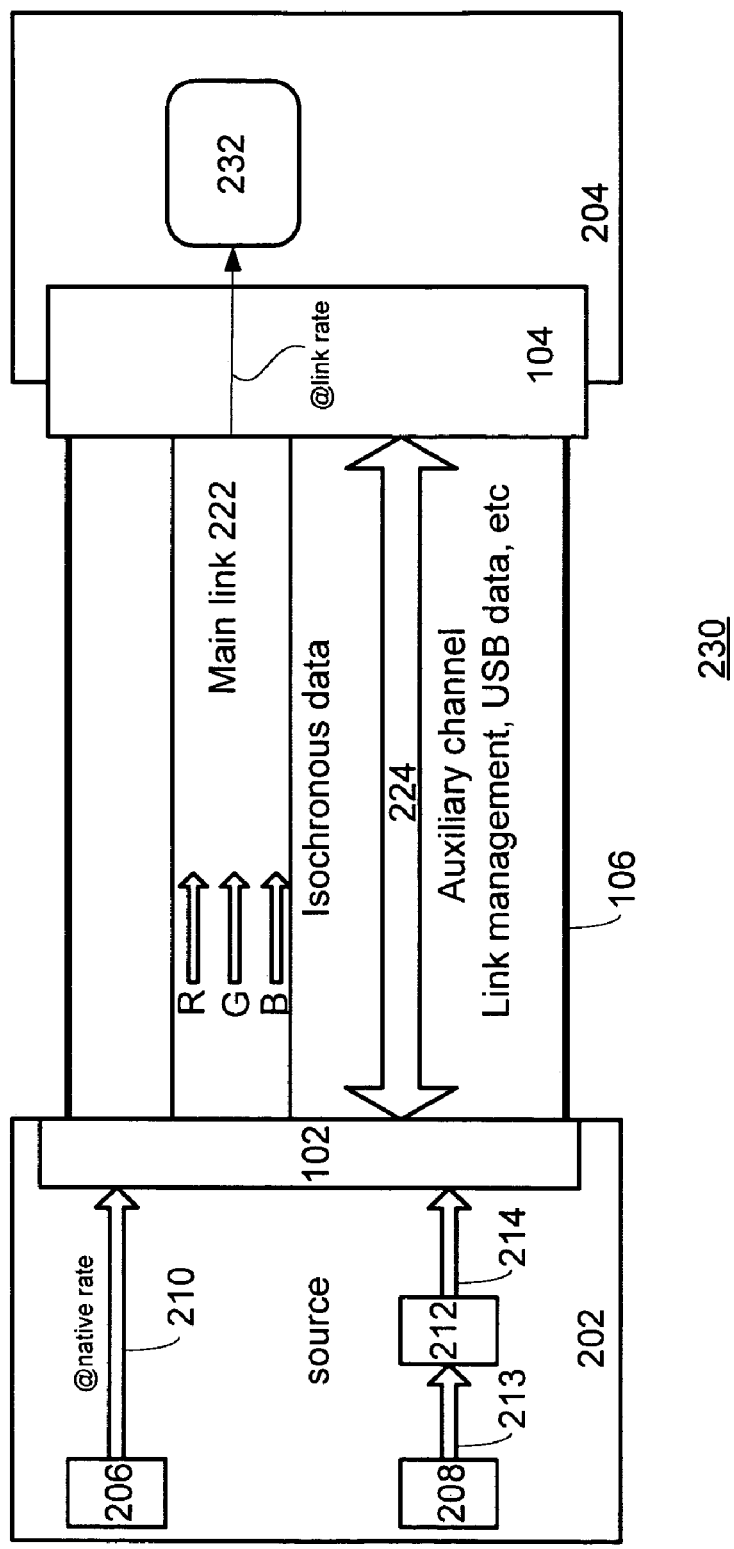

FIG. 2 illustrates a system 200 based upon the system 100 shown in FIG. 1 that is used to connect a video source 202 and a video display unit 204. In the illustrated embodiment, the video source 202 can include either or both a digital image (or digital video source) 206 and an analog image (or analog video source) 208. In the case of the digital image source 206, a digital data stream 210 is provided to the transmitter 102 whereas in the case of the analog video source 208, an A/D converter unit 212 coupled thereto, converts an analog data stream 213 to a corresponding digital data stream 214. The digital data stream 214 is then processed in much the same manner as the digital data stream 210 by the transmitter 102. The display unit 204 can be an analog type display or a digital type display or in some cases can process either analog or digital signals provided thereto. In any case, the display unit 204 includes a display interface 216 that interfaces the receiver 104 with a display 218 and a D/A converter unit 220 in the case of an analog type display. In the described embodiment, the video source 202 can take any number of forms (such as a personal desktop computer, digital or analog TV, set top box, etc.) whereas the video display unit 104 can take the form of a video display (such as an LCD type display, CRT type display, etc.).

Regardless of the type of video source or video sink, however, the various data streams are digitized (if necessary) and packetized prior to transmission over the physical link 106 which includes a uni-directional main link 222 for isochronous data streams and a bi-directional auxiliary channel 224 for link setup and other data traffic (such as various link management information, Universal serial bus (USB) data, etc.) between the video source 202 and the video display 204.

The main link 222 is thereby capable of simultaneously transmitting multiple isochronous data streams (such as multiple video/graphics streams and multi-channel audio streams). In the described embodiment, the main link 222 includes a number of different virtual channels, each capable of transferring isochronous data streams (such as uncompressed graphics/video and audio data) at multiple gigabits per second (Gbps). From a logical viewpoint, therefore, the main link 222 appears as a single physical pipe and within this single physical pipe, multiple virtual pipes can be established. In this way, logical data streams are not assigned to physical channels rather, each logical data stream is carried in its own logical pipe (i.e., virtual channel described above).

In the described embodiment, the speed, or transfer rate, of the main link 222 is adjustable to compensate for link conditions. For example, in one implementation, the speed of the main link 222 can be adjusted in a range approximated by a slowest speed of about 1.0 Gbps to about 2.5 Gbps per channel in approximately 0.4 Gbps increments (see FIG. 3). At 2.5 Gbps per channel, the main link 222 can support SXGA 60 Hz with a color depth of 18 bits per pixel over a single channel. It should be noted that a reduction in the number of channels reduces not only the cost of interconnect, but also reduces the power consumption which is an important consideration (and desirable) for power sensitive applications such as portable devices and the like. However, by increasing the number of channels to four, the main link 222 can support WQSXGA (3200×2048 image resolution) with a color depth of 24-bits per pixel at 60 Hz. or QSXGA (2560×2048) with a color depth of 18-bits per pixel at 60 Hz, without data compression. Even at the lowest rate of 1.0 Gbps per channel, only two channels are required to support an uncompressed HDTV (i.e., 1080i or 720p) data stream.

In the described embodiment, a main link data rate is chosen whose bandwidth exceeds the aggregate bandwidth of the constituent virtual links. Data sent to the interface arrives at the transmitter at its native rate. A time-base recovery (TBR) unit 226 within the receiver 104 regenerates the stream's original native rate using time stamps embedded in the main link data packets, if necessary. It should be noted, however, that for appropriately configured digital display devices 232 shown in FIG. 2B, time base recovery is unnecessary since display data is be sent to the display driver electronics at the link character clock rate, thereby greatly reducing the number of channels required with a commensurate reduction in complexity and cost for the display. For example, an exemplary LCD panel configured in such a way would require no time base recovery since display data is pipelined directly to the column drivers that are used in combination with row drivers to drive selected display elements.

Other embodiments describe a simple enumeration method for the link rate and the pixel/audio clock rate. It has been researched and understood that all the standard pixel/audio clock frequencies that exist today are a subset of the following master frequency:

$$23.76 \text{ GHz}=2^{10}\times3^3\times5^7\times11^1 \text{ Hz}$$

This means that a pixel (or audio) clock rate can be expressed with four parameters, A, B, C, and D as:

$$\text{Pixel clock rate}=2^A \ast 3^B \times 5^C \times 11^D$$

$$A=4 \text{ bits, } B=2 \text{ bits, } C=3 \text{ bits, and } D=1 \text{ bit.}$$

Even for a link whose link rate (which is the serial link bit rate/10 for a link that uses 10-bit character such as 8B/10B characters) may be different from the pixel clock rate, there is a benefit in defining the link rate with these four parameters, A', B', C', and D': The benefit is the simplicity in regenerating pixel/audio clocks from a link clock. For example, let's say the link rate is set as A'=6, B'=3, C'=7, and D'=0 and the corresponding link rate is 135 MHz. However, suppose the pixel clock rate is set as A=8, B=3, C=6, and D=0 (=108 MHz), then the pixel clock can be generated from link clock as pixel clock rate is equal to the link rate *22/5 1.

Referring back to those systems requiring time base recovery, the time-base recovery unit 226 may be implemented as a digital clock synthesizer. For an uncompressed video stream, the time stamp is stored in the packet header which as described in more detail below, is a 20-bit value. For a given stream, four of 20 bits are stored in each header successively (TS3-0, TS7-4, TS11-8, TS15-12, TS19-16). Native stream frequency (Freq_native) is obtained from link character clock frequency (Freq_link_char) as:

$$\text{Freq\_native}=\text{Freq\_link\_char}\ast(\text{TS}19\text{-}0)/220.$$

The transmitter 102 generates this time stamp by counting the number of native stream clocks in 220 cycles of the link character clock frequency period. The counter updates the value every 220 cycles of the link character clock. Since these two clocks are asynchronous with each other, the time stamp value will change by 1 over time. Between updates, the transmitter 102 will repeatedly send the same time stamp in the header of the given packet stream. A sudden change of the time stamp value (by more than 1 count) may be interpreted by the receiver as an indication of an unstable condition of the stream source.

It should be noted that, no time stamp is communicated for an audio stream. In this case, the source device informs the display device of the audio sample rate and number of bits per sample. By determining the audio rate as below and the link character rate, the display device regenerates the original audio stream rate.

Audio rate=(audio sample rate)×(# bits per sample)×(# channels)

Figure 4A:
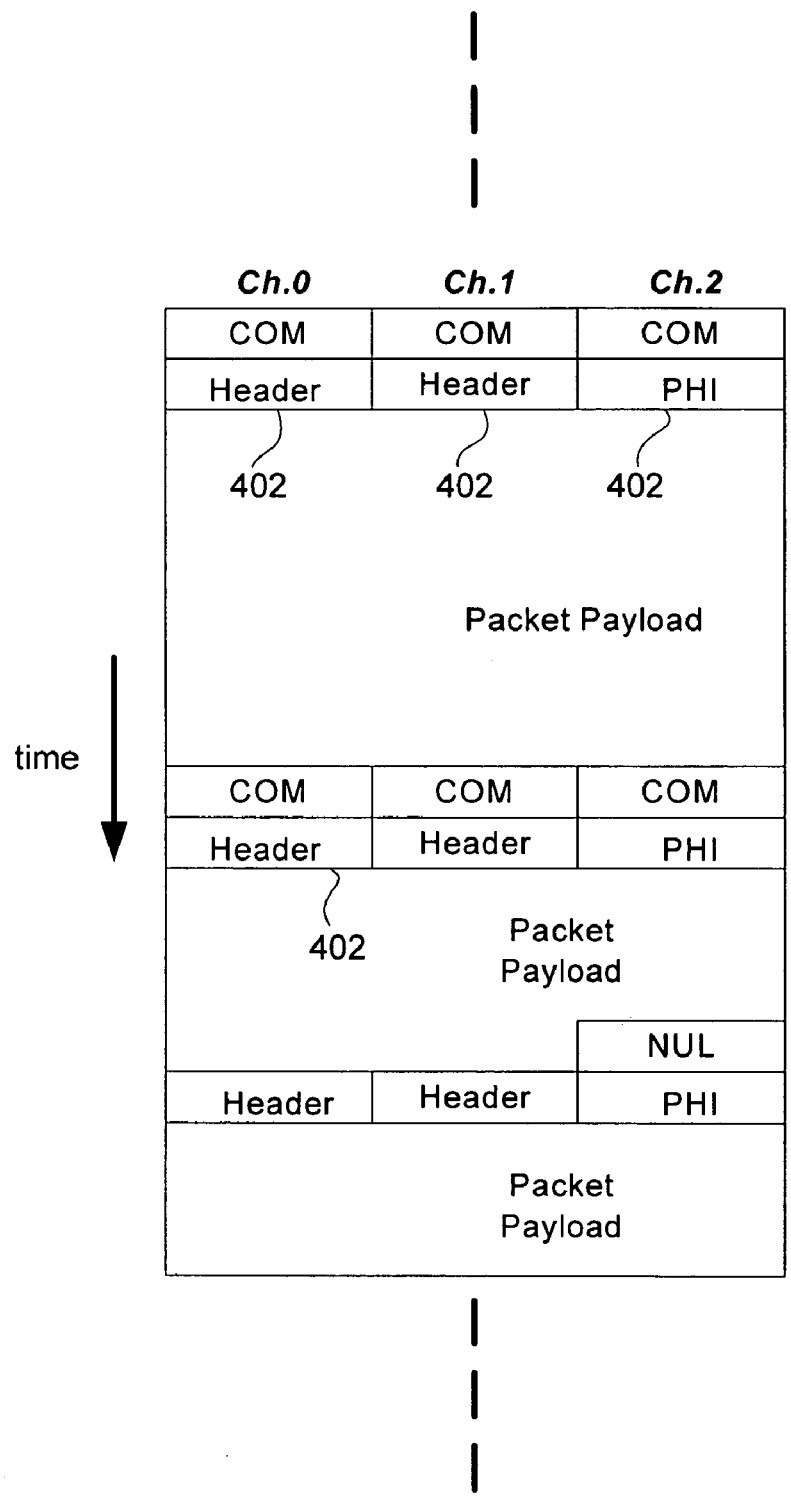
FIG. 4A shows a main link data packet in accordance with an embodiment of the invention.
Figure 4B:
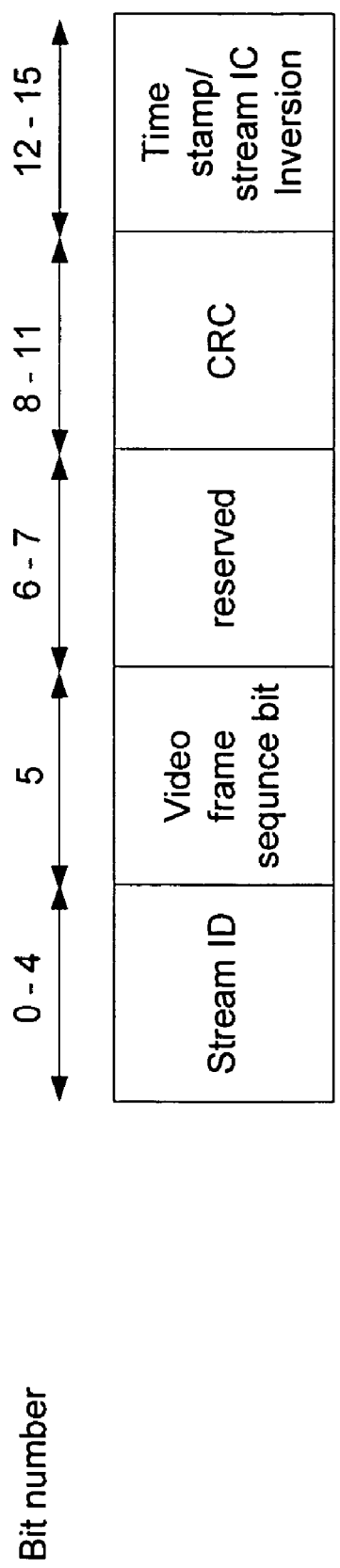
FIG. 4B shows a main link packet header in accordance with an embodiment of the invention.

A main link data packet 400 shown in FIG. 4A includes a main link packet header 402 as shown in FIG. 4B that is formed of 16 bits where bits 3-0 are the Stream ID (SID) (indicating that maximum stream count is 16), bit 4 is the Time Stamp (TS) LSB. When bit 4 is equal to 1, this packet header has the least significant 4 bits of Time Stamp value (used only for uncompressed video stream). Bit 5 is a Video frame sequence bit which acts as the least significant bit of the frame counter which toggles from "0" to "1" or from "1" to "0" at the video frame boundary (used only for uncompressed video stream). Bits 7 and 6 are reserved whereas bits 8 through 10 are a 4-bit CRC (CRC) that checks errors for the previous eight bits. Bits 15-12 are Time Stamp/Stream ID Inversion. (TSP/SIDn) which for uncompressed video are used as four bits of 20-bit Time Stamp value.

Figure 5A:
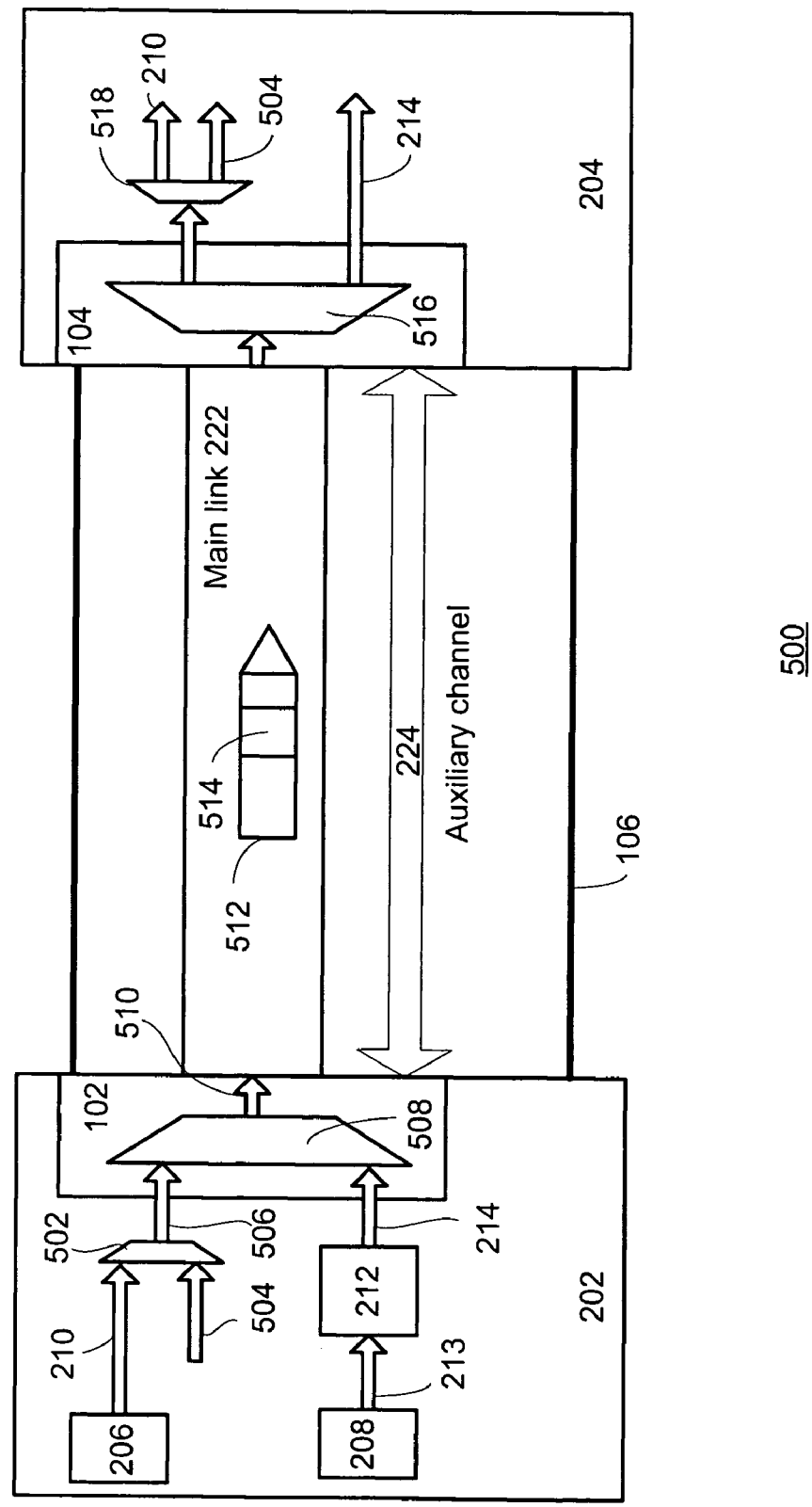
FIG. 5A shows a system arranged to provide sub-packet enclosure and multiple-packet multiplexing in accordance with an embodiment of the invention.

One of the advantages of the inventive interface is the ability to multiplex different data streams each of which can be different formats as well as have certain main link data packets include a number of sub packets. For example, FIG. 5A shows a system 500 arranged to provide sub-packet enclosure and multiple-packet multiplexing in accordance with an embodiment of the invention. It should be noted that the system 500 is a particular embodiment of the system 200 shown in FIG. 2 and should therefore not be construed as limiting either the scope or intent of the invention. The system 500 includes a stream source multiplexer 502 included in the transmitter 102 used to combine a stream 1 supplemental data stream 504 with the data stream 210 to form a multiplexed data stream 506. The multiplexed data stream 506 is then forwarded to a link layer multiplexer 508 that combines any of a number of data streams to form a multiplexed main link stream 510 formed of a number of data packets 512 some of which may include any of a number of sub packets 514 enclosed therein. A link layer de-multiplexer 516 splits the multiplexed data stream 510 into its constituent data streams based on the stream IDs (SIDs) and associated sub packet headers while a stream sink de-multiplexer 518 further splits off the stream 1 supplemental data stream contained in the sub-packets.

Figure 5B:
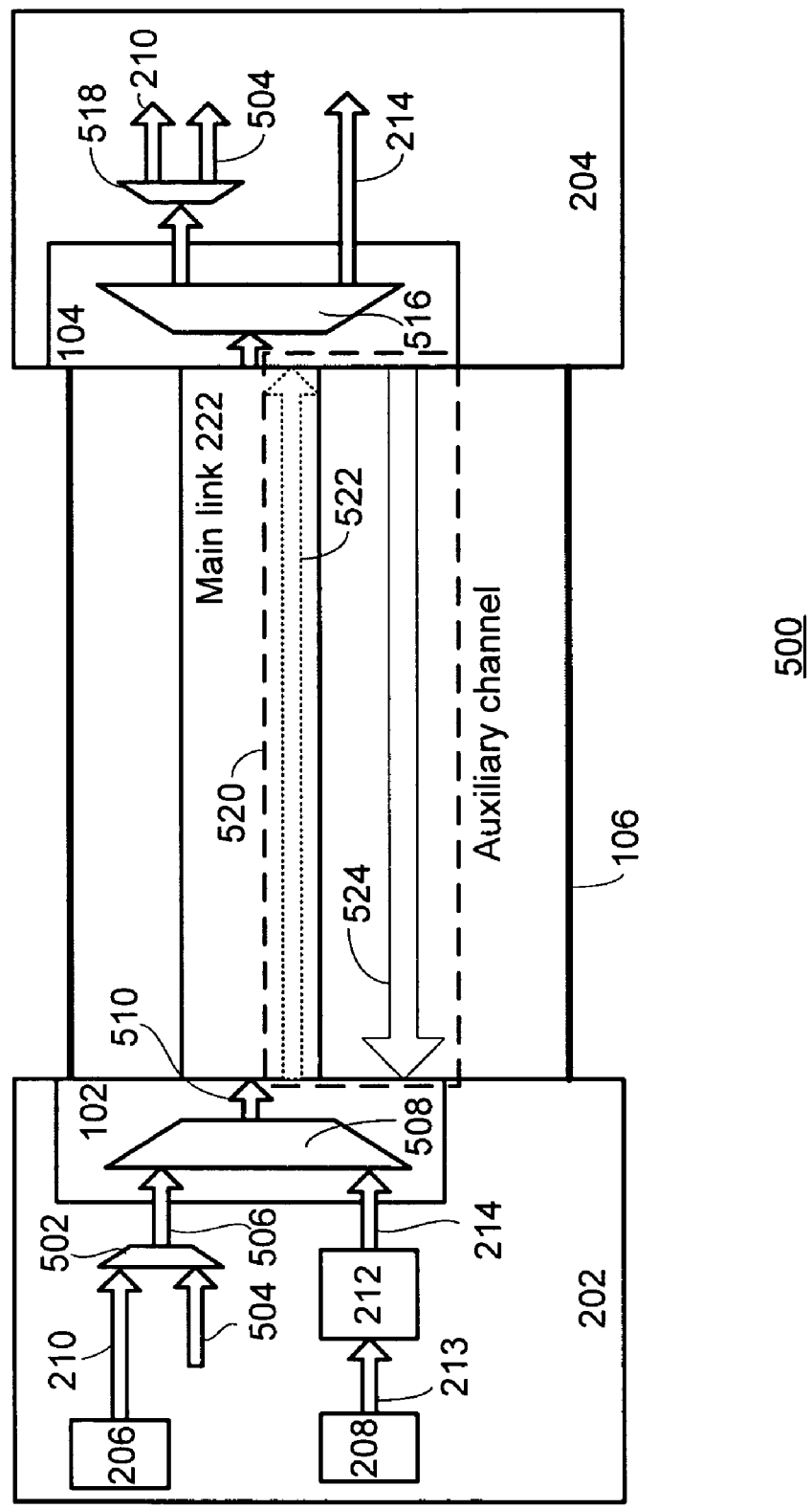
FIG. 5B shows another implementation of the system shown in FIG. 5A.
Figure 6:
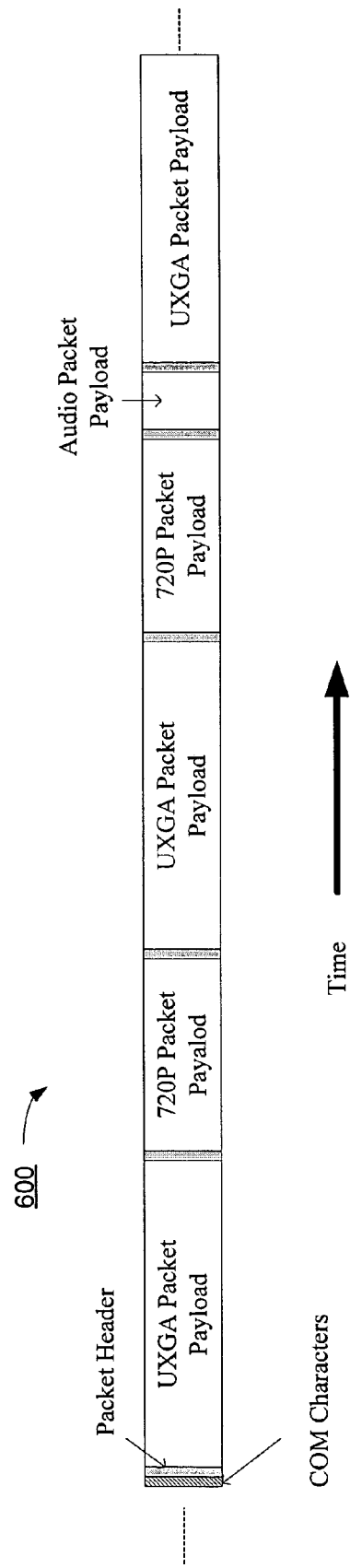
FIG. 6 shows a high-level diagram of the multiplexed main link stream as an example of the stream shown in FIG. 5.

FIG. 6 shows a high-level diagram of the multiplexed main link stream 600 as an example of the stream 510 shown in FIG. 5 when three streams are multiplexed over the main link 222. The three streams in this example are: UXGA graphics (Stream ID=1), 1280×720p video (Stream ID=2), and audio (Stream ID=3). The small packet header size of main link packet 400 minimizes the packet overhead, which results in the very high link efficiency. The reason the packet header can be so small is that the packet attributes are communicated via the auxiliary channel 224 prior to the transmission of the packets over main link 222.

Figure 7:
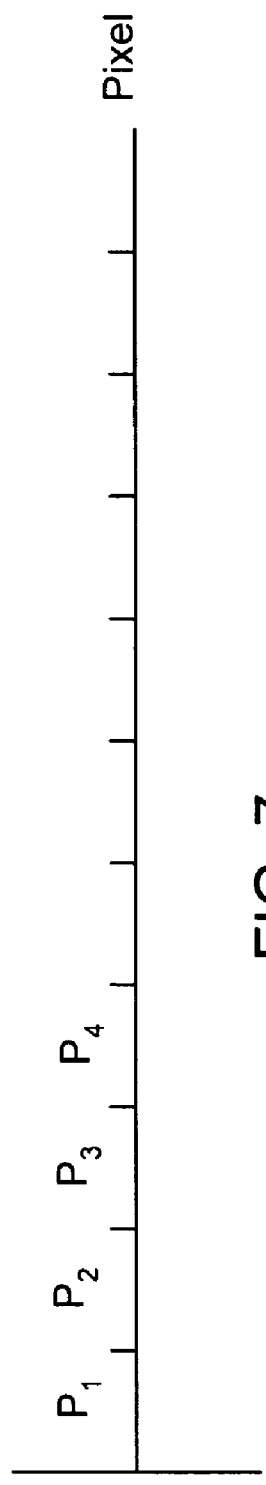
FIG. 7 show another example of a data stream in accordance with the invention.
Figure 8:
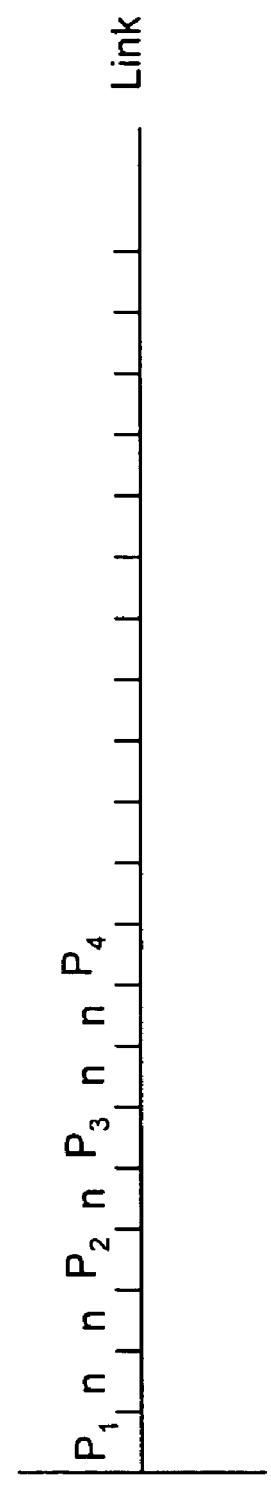
FIG. 8 shows yet another example of a multiplexed data stream in accordance with an embodiment of the invention.

Generally speaking, the sub-packet enclosure is an effective scheme when the main packet stream is an uncompressed video since an uncompressed video data stream has data idle periods corresponding to the video-blanking period. Therefore, main link traffic formed of an uncompressed video stream will include series of Null special character packets during this period. By capitalizing on the ability to multiplex various data streams, certain implementations of the present invention use various methods to compensate for differences between the main link rate and the pixel data rate when the source stream is a video data stream. For example, as illustrated in FIG. 7, the pixel data rate is 0.5 Gb/sec, such that a bit of pixel data is transmitted every 2 ns. In this example, the link rate has been set to 1.25 Gb/sec, such that a bit of pixel data is transmitted each 0.8 ns. Here, transmitter 102 intersperses special characters between pixel data as illustrated in FIG. 8. Two special characters are disposed between a first bit of pixel data P1 and a second bit of pixel data P2. The special characters allow receiver 104 to distinguish each bit of pixel data. Interspersing the special characters between bits of pixel data also creates a steady stream of data that allows the link to maintain synchronization. In this example, the special characters are Null characters. No line buffer is needed for such methods, only a small FIFO, because the link rate is sufficiently fast. However, relatively more logic is required on the receiving side to reconstruct the video signal. The receiver needs to recognize when the special characters begin and end.

An alternative to the interspersing method is to alternate consecutive bits of pixel data with special characters, such as null values. For example, P1 through P4 could be fed into a line buffer included in the transmitter 104, then one or more null values could be fed into the buffer until more pixel data are available. Such implementations require a relatively larger buffer space than the interspersing methods described above. In many such implementations, the time required to fill the line buffer will exceed the time required to transmit the data after the line buffer is full, due to the relatively high link speeds.

Figure 9B:
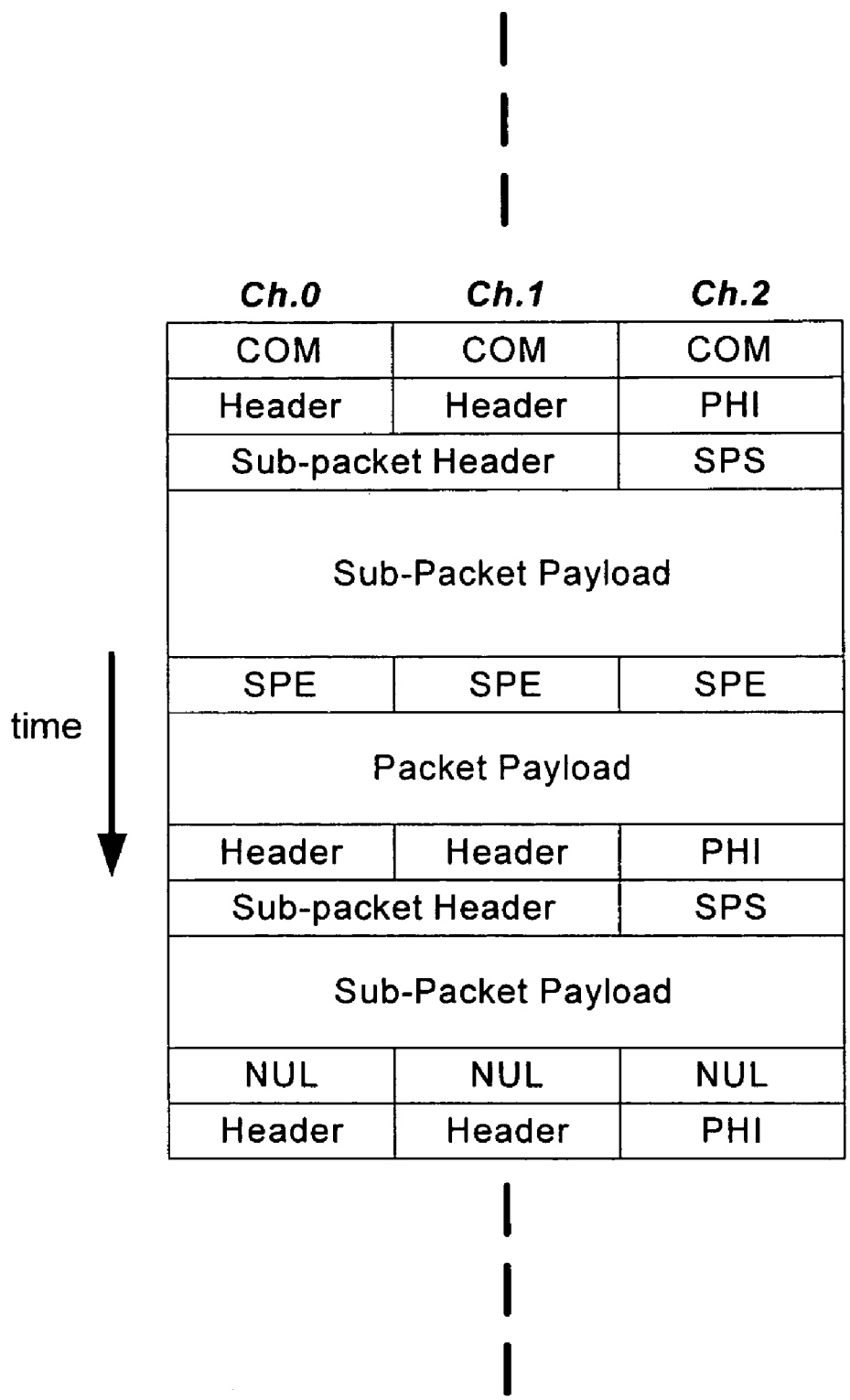
FIG. 9B shows a representative main link data packet in accordance with an embodiment of the invention.

As discussed with reference to FIG. 5A, one of the advantages of the inventive interface is the ability to not only multiplex various data streams, but also the enclosing of any of a number of sub packets within a particular main link data packet. FIG. 9A shows a representative sub-packet 900 in accordance with an embodiment of the invention. The sub-packet 900 includes a sub-packet header 902 that in the described embodiment is 2 bytes and is accompanied by SPS (Sub-Packet Start) special character. If the main link data packet in which the sub-packet 900 is enclosed contains a packet payload in addition to the sub-packet 900, the end of the sub-packet 900 must be marked by SPE (Sub-Packet End) special character. Otherwise, the end of the main packet (as indicated by ensuing COM character in the example shown in FIG. 9B) marks the end of both the sub-packet 902 and the main packet into which it is enclosed. However, a sub-packet does not need to end with SPE when its enclosing main packet has no payload. FIG. 9B shows an exemplary sub-packet format within a main link packet in accordance with an embodiment of the invention. It should be noted that the definition of the header field and sub-packet payload is dependent on the specific application profile that uses the sub-packet 902.

Figure 10:
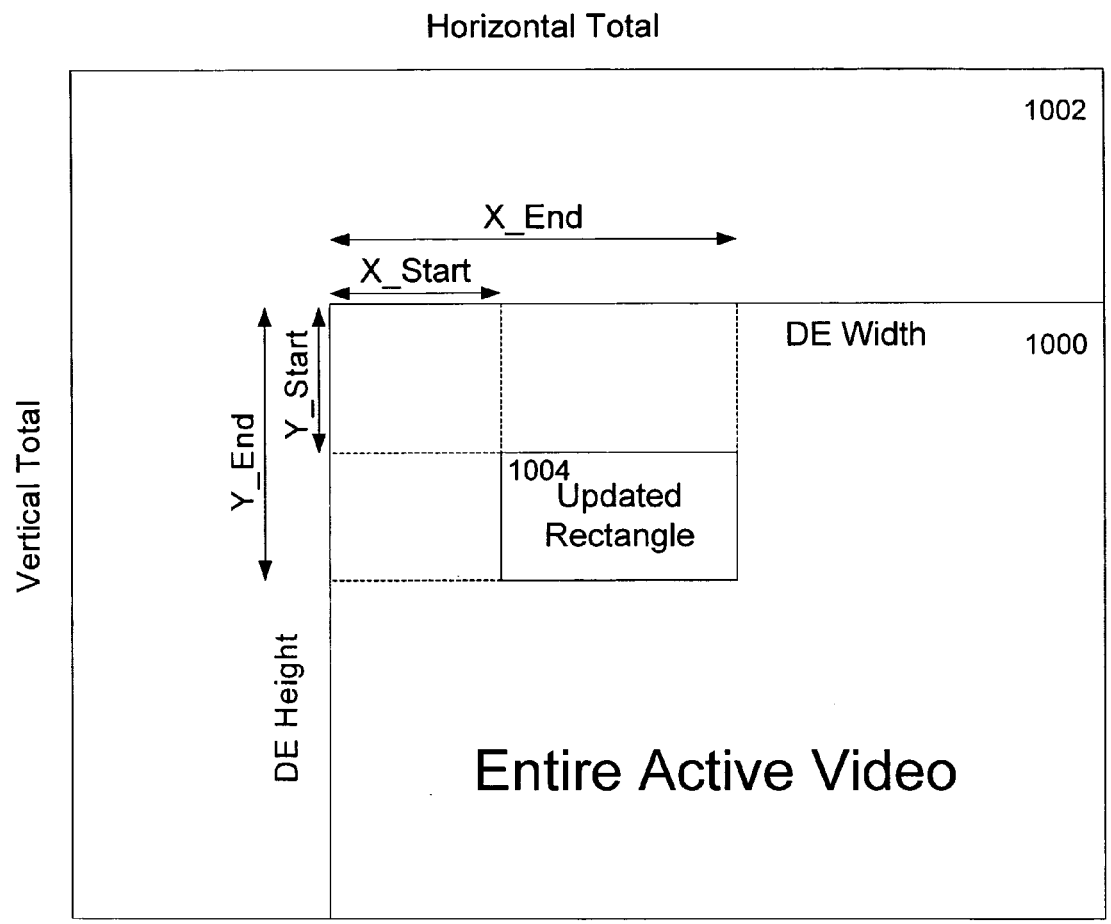
FIG. 10 shows an example of a selectively refreshed graphics image.

A particularly useful example of sub-packet enclosure usage is selective refresh of an uncompressed graphics image 1000 illustrated in FIG. 10. The attributes of the entire frame 1002 (Horizontal/Vertical Total, Image Width/Height, etc.) will be communicated via the auxiliary channel 224 since those attributes stay constant as long as the stream remains valid. In selective refresh operation, only a portion 1004 of the image 1000 is updated per video frame. The four X-Y coordinates of the updated rectangle(s) (i.e., the portion 1004) must be transmitted every frame since the values of the rectangle coordinates changes from frame to frame. Another example is the transmission of color look-up table (CLUT) data for required for 256-color graphic data where the 8-bit pixel data is an entry to the 256-entry CLUT and the content of the CLUT must be dynamically updated.

The single bi-directional auxiliary channel 224 provides a conduit to for various support functions useful for link set up and supporting main link operations as well as to carry auxiliary application data such as USB traffic. For example, with the auxiliary channel 224, a display device can inform the source device of events such as sync loss, dropped packets and the results of training sessions (described below). For example, if a particular training session fails, the transmitter 102 adjusts the main link rate based upon pre-selected or determined results of the failed training session. In this way, the closed loop created by combining an adjustable, high speed main link with a relatively slow and very reliable auxiliary channel allows for robust operation over a variety of link conditions. It should be noted that in some cases (an example of which is shown in FIG. 5B), a logical bi-directional auxiliary channel 520 can be established using a portion 522 of the bandwidth of the main link 222 to transfer data from the source device 202 to the sink device 204 and a uni-directional back channel 524 from the sink device 204 to the source device 202. In some applications, use of this logical bi-directional auxiliary channel may be more desirable than using a half-duplex bi-directional channel described in FIG. 5A.

Prior to starting the transmission of actual packet data streams the transmitter 102 establishes a stable link through a link training session that is analogous in concept to the link setup of the modem. During link training, the main link transmitter 102 sends a pre-defined training pattern so that the receiver 104 can determine whether it can achieve a solid bit/character lock. In the described embodiment, training related handshaking between the transmitter 102 and the receiver 104 is carried on the auxiliary channel. An example of a link training pattern is shown in FIG. 11 in accordance with an embodiment of the invention. As illustrated, during the training session, a phase 1 represents the shortest run length while phase 2 is the longest that are used by the receiver to optimize an equalizer. In phase 3, both bit lock and character lock are achieved as long as the link quality is reasonable. Typically, the training period is about 10 ms, in which time, approximately 107 bits of data are sent. If the receiver 104 does not achieve solid lock, it informs the transmitter 102 via the auxiliary channel 224 and the transmitter 102 reduces the link rate and repeats the training session. In addition to providing a training session conduit, the auxiliary channel 224 can be also used to carry main link packet stream descriptions thereby greatly reducing the overhead of packet transmissions on the main link 222. Furthermore, the auxiliary channel 224 can be configured to carry Extended Display Identification Data (EDID) information replacing the Display Data Channel (DDC) found on all monitors (EDID is a VESA standard data format that contains basic information about a monitor and its capabilities, including vendor information, maximum image size, color characteristics, factory pre-set timings, frequency range limits, and character strings for the monitor name and serial number. The information is stored in the display and is used to communicate with the system through the DDC which sites between the monitor and the PC graphics adapter. The system uses this information for configuration purposes, so the monitor and system can work together). In what is referred to as an extended protocol mode, the auxiliary channel can carry both asynchronous and isochronous packets as required to support additional data types such as keyboard, mouse and microphone.

Figure 12:
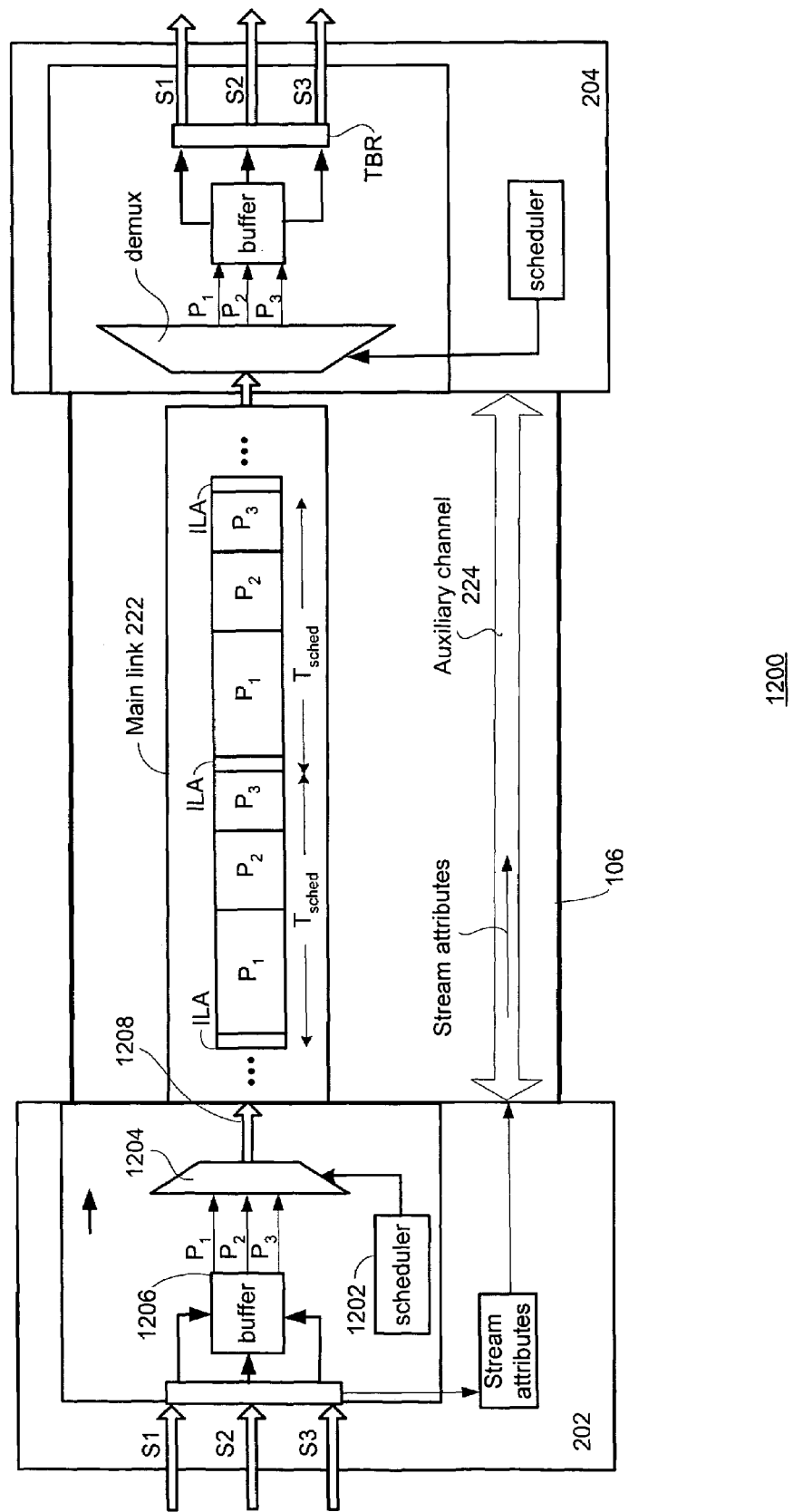
FIG. 12 shows a representative system having a data stream scheduler in accordance with an embodiment of the invention.

FIG. 12 shows a representative system 1200 having a data stream scheduler 1202 in accordance with an embodiment of the invention. It should be noted that the system 1200 is based upon the system 500 described with reference to FIGS. 5A and 5B and should therefore be considered only one of any number of implementations of the invention. Accordingly, the stream scheduler 1202 is incorporated in or coupled to the video source 202 and is, in turn, coupled to a multiplexor 1204 and a data buffer 1206 suitable for storing only those portions of the incoming data streams (S1, S2, and S3) used to populate a link data stream 1208 during a period of time referred to as a scheduler cycle time $T_{sched}$. In the described embodiment, the data buffer 1206 is typically on the order of tens of bytes in size as opposed to over 60 K bytes typical for isochronous video transfer protocols such as FireWire™. In this way, the link efficiency (based upon a comparing of the aggregate of the payload bandwidth of data streams divided by the available link bandwidth) is approximately on the order of 90% or greater.

In the described embodiment, the link data stream 1208 is formed by the scheduler 1202 by using time division multiplexing to combine size data packets P1, P2, and P3 (whose size reflects the relative bandwidth for each data stream in relation to a link bandwidth) from each of the data streams S1, S2, and S3, respectively. As described previously, the size of each data packet is a function of the particular data stream bit rate (SBR) and the link bit rate (LBR). In particular, the greater the particular data stream bit rate, the larger the particular data packet size as shown by the example of Table 1. For example, if the link bit rate LBR is on the order of 2.5 Gbps and the maximum packet size is approximately on the order of 80 link symbols (where one link symbol is defined as a data unit per link clock and is typically 4 ns) and using the assumptions of Table 1 (i.e., SBR1 is 1.0 Gbps, SBR2 is 0.3125 Gbps and SBR3 is 0.25 Gbps) then data packet P1 associated with stream S1 is 32 link symbols while the data packets P2 and P3 associated with streams S2 and S3 are 10 link symbols and 8 link symbols, respectively. It should be noted that at the beginning of each scheduler cycle time $T_{sched}$, the scheduler 1202 inserts an interlane alignment packet (ILA) that provides an alignment tool for the receiver 204 that is typically on the order of 2 link symbols in size. In this example, therefore, the scheduler cycle time $T_{sched}$ is on the order of (32+10+8+2) 52 link symbols (which would translate to approximately 208 ns when each link symbol represents approximately 4 ns).

It should also be noted that each data packet P has an associated active data ratio of the number of data symbols D and stuffing symbols N related to the stream bit rate (SBR) and the link bit rate (LBR) by

SBR/LBR=D/(D+N).

Therefore in those saturations where a data stream is either added (or deleted) resulting in an increase (or decrease) of the scheduler cycle time Tsched, the packet size P for remains constant by varying the number of stuffing symbols N in relation to the number of data symbols D. Since with the addition (or deletion) of a data stream, since the particular packet sizes remain the same for the other data streams and the scheduler cycle time Tsched increases (or decreases) then the number of stuffing symbols N increases (or decreases) commensurate with the change in Tsched. In the "degenerate" case where there remains only a single data stream, then there are no stuffing symbols N.

Figure 13:
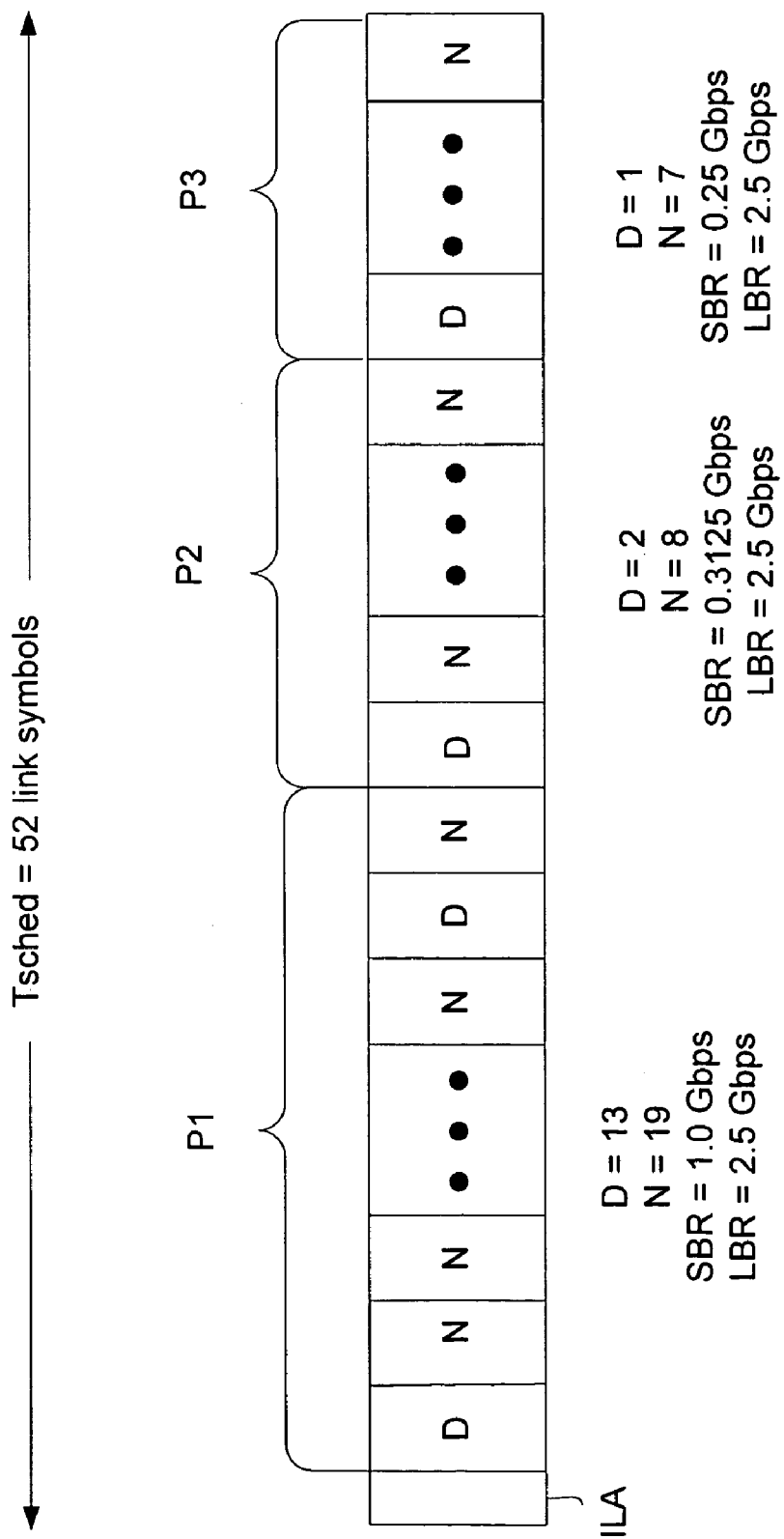
FIG. 13 shows a more detailed portion of the data stream shown in FIG. 12.

FIG. 13 shows a more detailed portion 1300 of the data stream 1210 in accordance with an embodiment. In particular, FIG. 13 shows the arrangement of data symbols D and stuffing symbols N for the data stream 1208 using the values shown in Table 1. It should also be noted that dynamically adding or deleting a particular data stream leaves the particular packet sizes for the remaining data stream unaffected.

Figure 14:
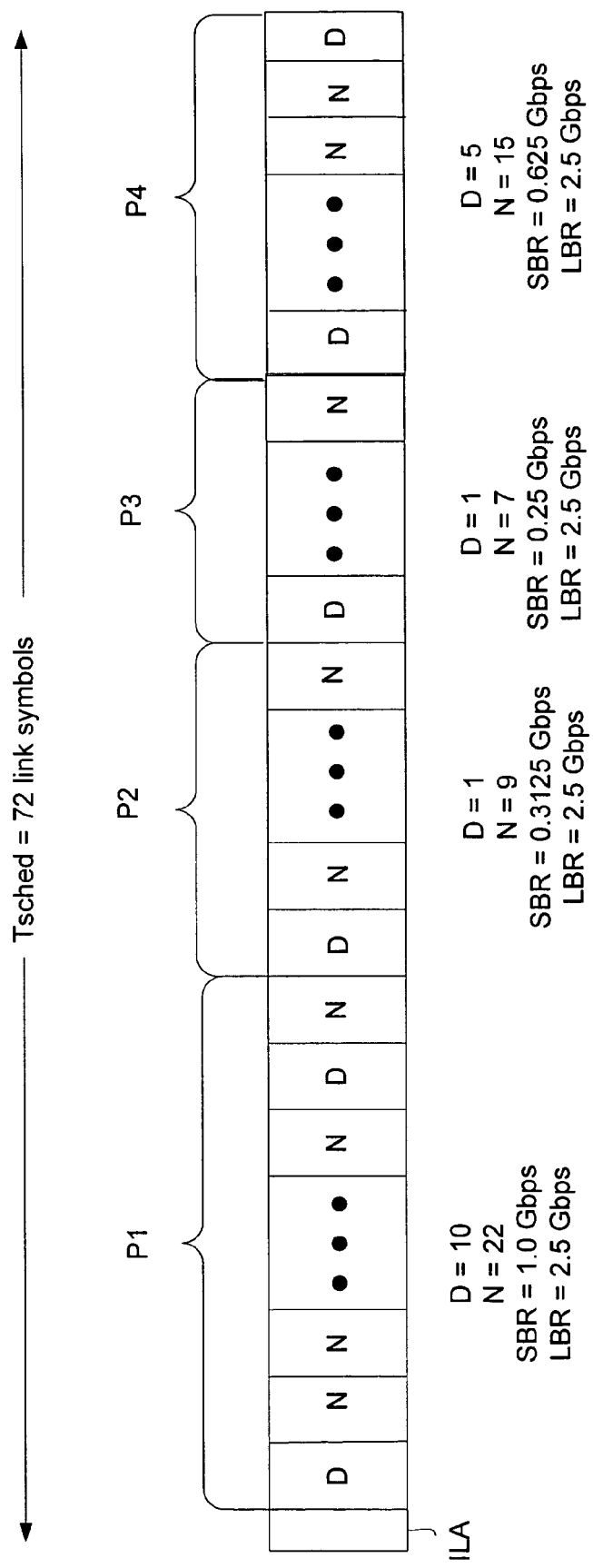
FIG. 14 illustrates the addition of a fourth data stream in accordance with an embodiment of the invention.

Accordingly, FIG. 14 illustrates the addition of a fourth data stream S4 having a stream bit rate of 0.625 Gbps that corresponds to a packet size P4 of 20 link symbols resulting in an increase in $T_{sched}$ from 52 to 72 link symbols (that corresponds to 288 ns for a link symbol equal to 4 ns). However, in order to keep the particular packet sizes P1, P2, and P3 constant, the number of stuffing symbols N increases for each data packet. Conversely, in the case where a data stream is deleted (such as S3, for example) the scheduler cycle time $T_{sched}$ will decrease accordingly with an commensurate increase in the number of data symbols D in relation to the number of stuffing symbols N. In the "degenerate" case where all data streams save one is deleted, then the remaining data packet has no stuffing symbols N and there is no need for any buffer thereby simulating the raster scan transport protocols discussed above.

Figure 15:
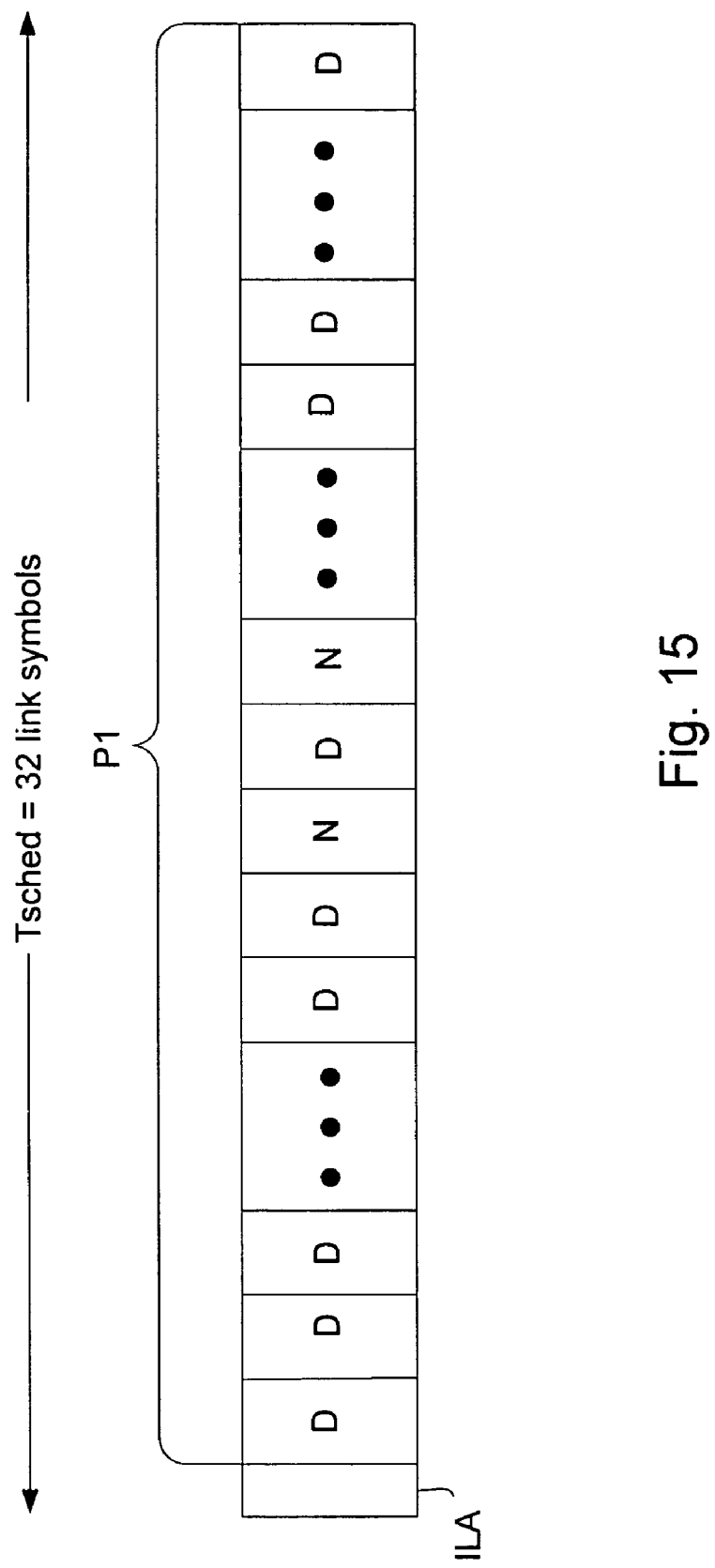
FIG. 15 shows a degenerate case of a single uncompressed data stream in accordance with an embodiment of the invention.
Figure 16:
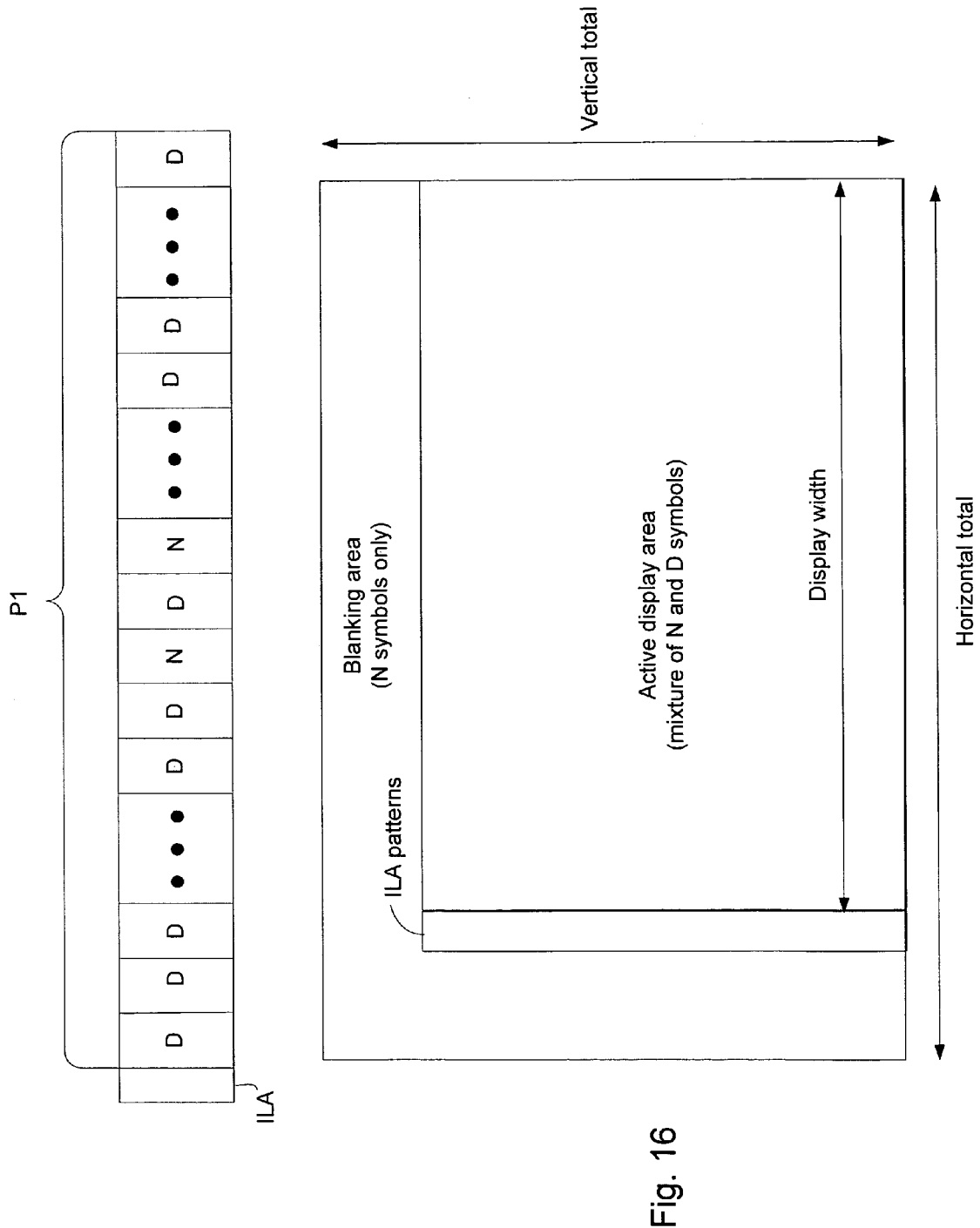
FIG. 16 shows a video display based upon the degenerate single data stream shown in FIG. 15.

Also, in the case where of the degenerate connection when the link data stream 1208 is a single, uncompressed video stream (as shown in FIG. 15) the ILA packets are placed in the idle period (the horizontal blanking region) of S1 and the active display region is then represented by a mixture of data symbols D and stuffing symbols N (see FIG. 16).

It should also be noted that the relative number of data symbols D provides an embedded time stamp in that by counting the number of data symbols D for a particular data stream with relation to data symbols not related to the particular data stream provides the stream clock for the data stream in question. For example, in the case shown in FIG. 13, in order to recover a stream clock $F_{stream\_clk}$ for a particular data stream can be determined by simply determining the number of stream data symbols (M) as compared to the total number of stuffing symbols and stream data symbols (P). More particularly, the stream clock $F_{stream\_clk}$ is determined by the following:

$$F_{stream\_clk} = (M/P) * F_{link\_clk}$$

where M and P can be measured by the receiver 204.

Figure 17:
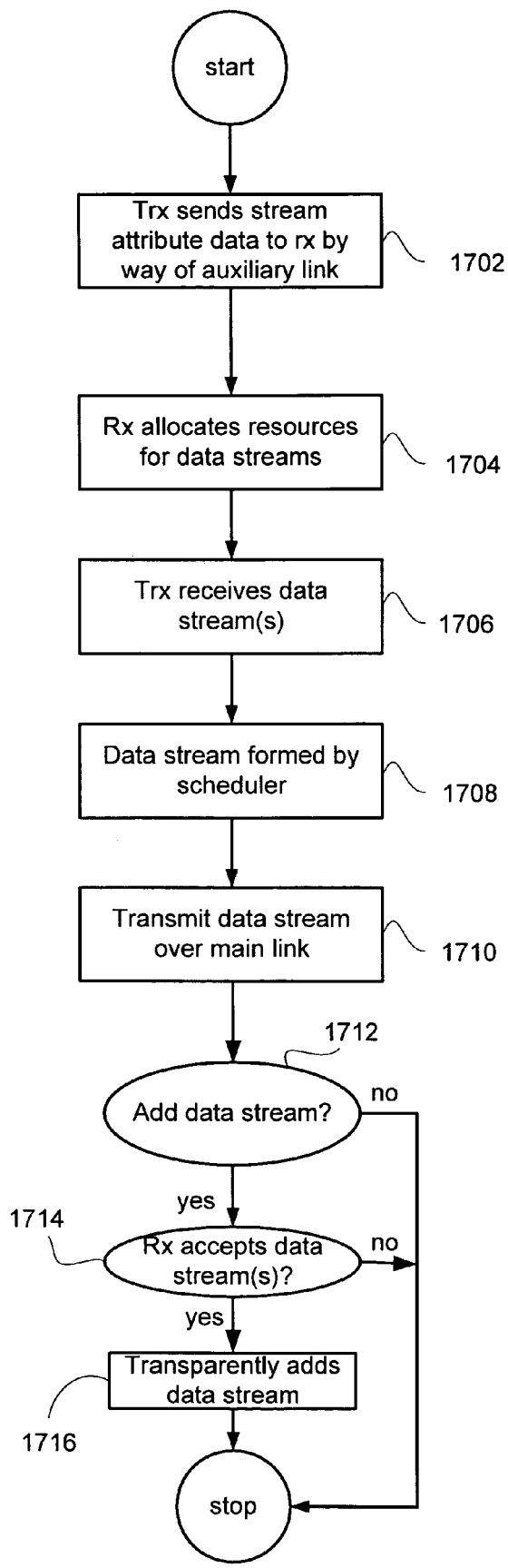
FIG. 17 shows a flowchart detailing a process for scheduling a number of data streams in accordance with an embodiment of the invention.

FIG. 17 shows a flowchart detailing a process 1700 for scheduling a number of data streams in accordance with an embodiment of the invention. The process 1700 begins at 1702 by the transmitter sending stream attribute data to the receiver. In the described embodiment, the attribute data is sent by way of an auxiliary link that couples the transmitter to the receiver. Next, at 1704, the receiver allocates sufficient resources (if available) to receive and process the incoming data streams. After the transmitter has received the data streams at 1706, the stream transport scheduler forms a link data stream at 1708 while at 1710 the link data stream is sent by way of a main link by the transmitter to the receiver. Next, at 1712, in those cases where an additional data stream is to be added and the receiver is capable of both receiving and processing the to be added data stream at 1714, the new data stream in added transparently at 1716 in that the data packet size for the previously transmitted data streams remain constant.

Figure 18:
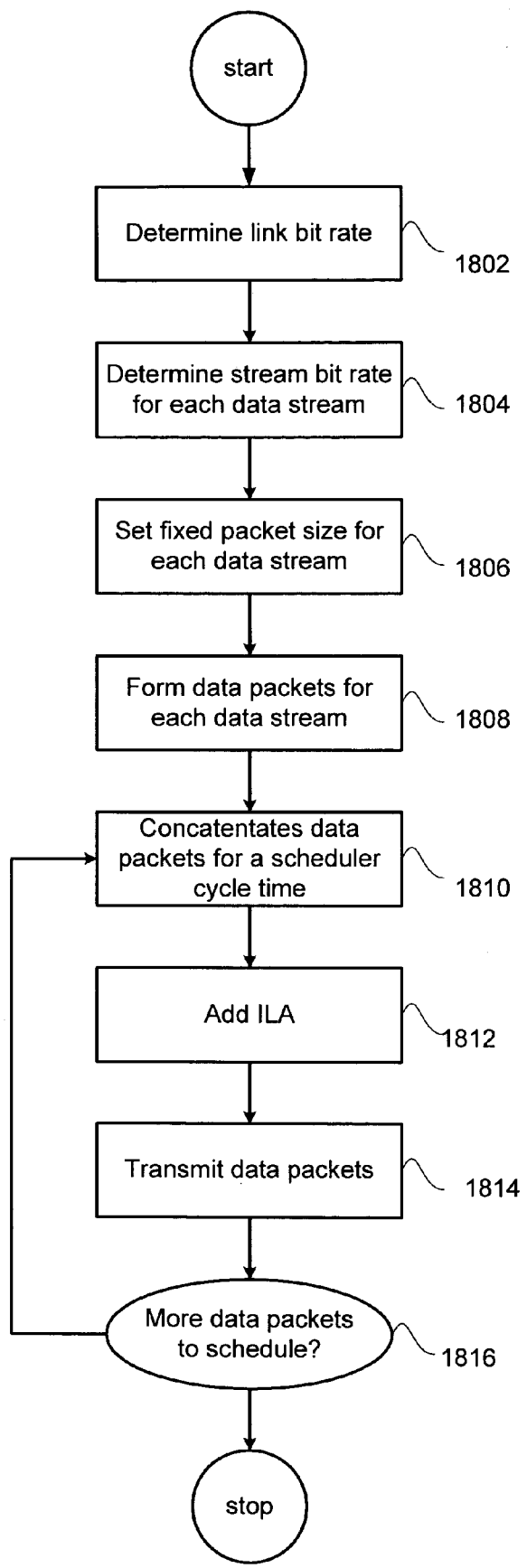
FIG. 18 shows a flowchart detailing a process for forming the link data stream in accordance with an embodiment of the invention.

FIG. 18 shows a flowchart detailing a process 1800 for forming the link data stream in accordance with an embodiment of the invention. It should be noted that the process 1800 is a particular implementation of forming operation 1708 of the process 1700. Accordingly, the transport scheduler determines the link bit rate for the main link at 1802 and the stream bit rate for each of the data streams to be transported by way of the link from the transmitter to the receiver at 1804. Next, at 1806, the packet size for each of the data streams is determined based upon the stream bit rate, the link bit rate, and a predetermined maximum packet size. Next at 1808, data packets for each of the data streams is formed each including a number of data symbols and stuffing symbols. Once the data packets are formed and during a single transport scheduler cycle time, the transport scheduler (using time division multiplexing) concatenates a data packet from each of the data streams to be sent to the receiver at 1810 and adds an interlane alignment packet to the concatenated data packets at 1812. At 1814, the transport scheduler signals the transmitter to transmit the concatenated data packets to the receiver and repeats 1808 through 1814 until the cessation of the transmission as determined at 1816.

Figure 19:
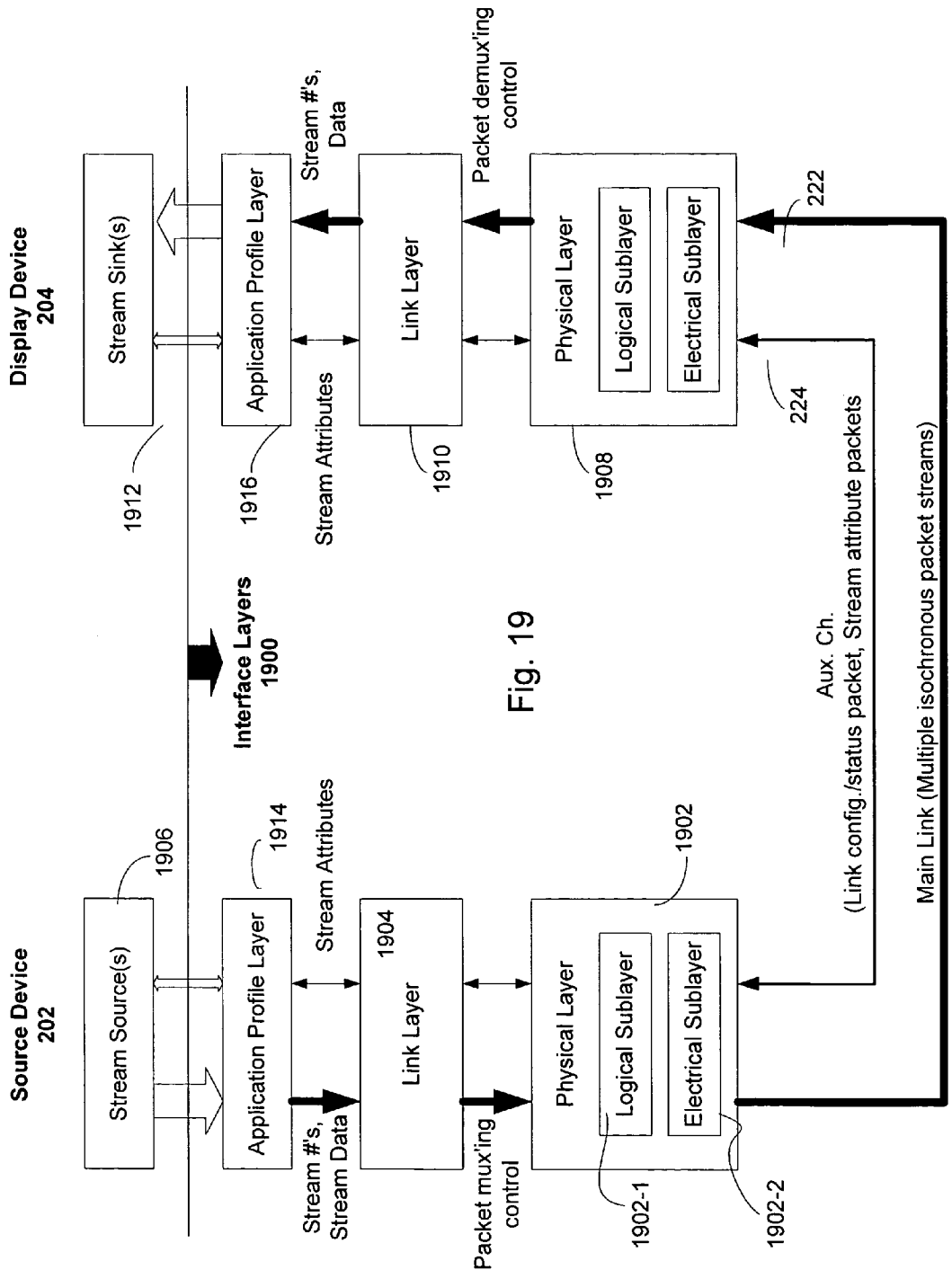
FIG. 19 illustrates a logical layering of the system in accordance with an embodiment of the invention.

FIG. 19 illustrates a logical layering 1900 of the system 200 in accordance with an embodiment of the invention. It should be noted that while the exact implementation may vary depending upon application, generally, a source (such as the video source 202) is formed of a source physical layer 1902 that includes transmitter hardware, a source link layer 1904 that includes multiplexing hardware and state machine (or firmware), and a data stream source 1906 such as Audio/Visual/Graphics hardware and associated software. Similarly, a display device includes a physical layer 1908 (including various receiver hardware), a sink link layer 1910 that includes de-multiplexing hardware and state machine (or firmware) and a stream sink 1912 that includes display/timing controller hardware and optional firmware. A source application profile layer 1914 defines the format with which the source communicates with the link layer 1904 and similarly, a sink application profile layer 1916 defines the format with which the sink 1912 communicates with the sink link layer 1910.

The various layers will now be discussed in more detail.

Source Device Physical Layer

Figure 21:
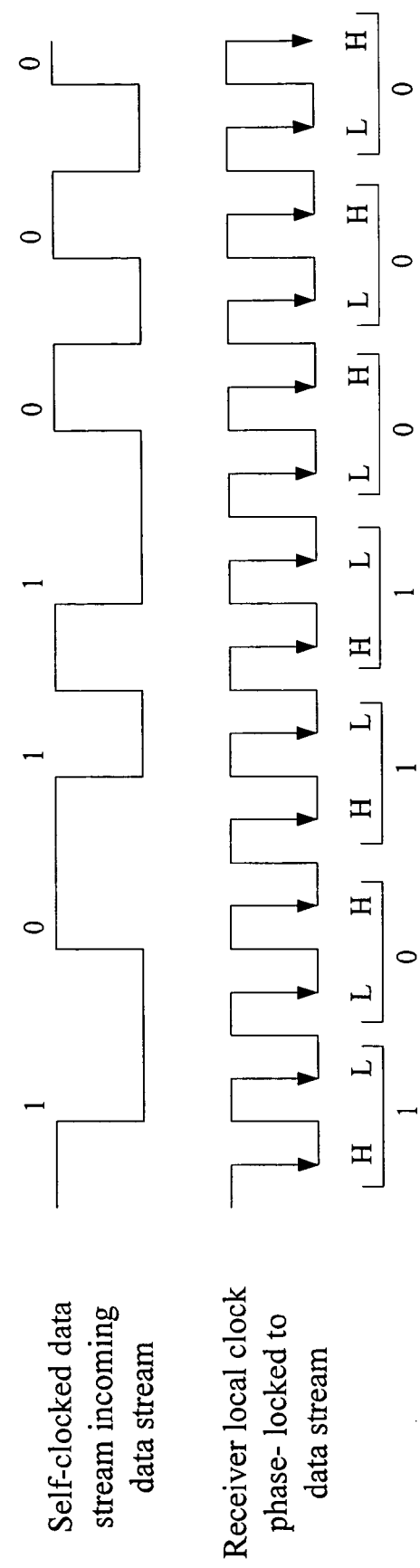
FIG. 21 shows an exemplary Manchester II encoding scheme in accordance with an embodiment of the invention.

In the described embodiment, the source device physical layer 1902 includes an electrical sub layer 1902-1 and a logical sub layer 1902-2. The electrical sub layer 1902-1 includes all circuitry for interface initialization/operation such as hot plug/unplug detection circuit, drivers/receivers/termination resistors, parallel-to-serial/serial-to-parallel conversions, and spread-spectrum-capable PLL's. The logical sub layer 1902-2 includes circuitry for, packetizing/de-packetizing, data scrambling/de-scrambling, pattern generation for link training, time-base recovery circuits, and data encoding/decoding such as 8B/10B (as specified in ANSI X3.230-1994, clause 11) that provides 256 link data characters and twelve control characters (an example of which is shown as FIG. 13) for the main link 222 and Manchester II for the auxiliary channel 224 (see FIG. 21).

It should be noted that the 8B/10B encoding algorithm is described, for example, in U.S. Pat. No. 4,486,739, which is hereby incorporated by reference. As known by those of skill in the art, the 8B/10B code is a block code that encodes 8-bit data blocks into 10-bit code words for serial transmission. In addition, the 8B/10B transmission code converts a byte wide data stream of random 1s and 0s into a DC balanced stream of 1s and 0s with a maximum run length of 5. Such codes provide sufficient signal transitions to enable reliable clock recovery by a receiver, such as transceiver 110. Moreover, a DC balanced data stream proves to be advantageous for fiber optic and electromagnetic wire connections. The average number of 1s and 0s in the serial stream is be maintained at equal or nearly equal levels. The 8B/10B transmission code constrains the disparity between the number of 1s and 0s to be −2, 0, or 2 across 6 and 4 bit block boundaries. The coding scheme also implements additional codes for signaling, called command codes.

It should be noted that in order to avoid the repetitive bit patterns exhibited by uncompressed display data (and hence, to reduce EMI), data transmitted over main link 222 is first scrambled before 8B/10B encoding. All data except training packets and special characters will be scrambled. The scrambling function is implemented with Linear Feedback Shift Registers (LFSRs). When data encryption is enabled, the initial value of an LFSR seed is dependent on an encryption key set. If it is data scrambling without encryption, the initial value will be fixed.

Since data stream attributes are transmitted over the auxiliary channel 224, the main link packet headers serve as stream identification numbers thereby greatly reducing overhead and maximizing link bandwidth. It should also be noted that neither the main link 222 nor the auxiliary link 224 has separate clock signal lines. In this way, the receivers on main link 222 and auxiliary link 224 sample the data and extract the clock from the incoming data stream. Fast phase locking for any phase lock loop (PLLs) circuit in the receiver electrical sub layer is important for since the auxiliary channel 224 is half-duplex bi-directional and the direction of the traffic changes frequently. Accordingly, the PLL on the auxiliary channel receiver phase locks in as few as 16 data periods thanks to the frequent and uniform signal transitions of Manchester II (MII) code At link set up time, the data rate of main link 222 is negotiated using the handshake over auxiliary channel 224. During this process, known sets of training packets are sent over the main link 222 at the highest link speed. Success or failure is communicated back to the transmitter 102 via the auxiliary channel 224. If the training fails, main link speed is reduced and training is repeated until successful. In this way, the source physical layer 1902 is made more resistant to cable problems and therefore more suitable for external host to monitor applications. However, unlike conventional display interfaces, the main channel link data rate is decoupled from the pixel clock rate. A link data rate is set so that link bandwidth exceeds the aggregate bandwidth of the transmitted streams.

Source Device Link Layer

The source link layer 1904 handles the link initialization and management. For example, upon receiving a hot plug detect event generated upon monitor power-up or connection of the monitor cable from the source physical layer 1902, the source device link layer 1904 evaluates the capabilities of the receiver via interchange over the auxiliary channel 224 to determine a maximum main link data rate as determined by a training session, the number of time-base recovery units on the receiver, available buffer size on both ends, availability of USB extensions and then notifies the stream source 1906 of an associated hot plug event. In addition, upon request from the stream source 1906, the source link layer 1904 reads the display capability (EDID or equivalent). During a normal operation, the source link layer 1904 sends the stream attributes to the receiver 104 via the auxiliary channel 224, notifies the stream source 1904 whether the main link 222 has enough resource for handling the requested data streams, notifies the stream source 1904 of link failure events such as sync loss and buffer overflow, and sends MCCS commands submitted by the stream source 1904 to the receiver via the auxiliary channel 224. All communications between the source link layer 1904 and the stream source/sink use the formats defined in the application profile layer 1914.

Application Profile Layer (Source and Sink)

In general, the Application Profile Layer defines formats with which a stream source (or sink) will interface with the associated link layer. The formats defined by the application profile layer are divided into the following categories, Application independent formats (Link Message for Link Status inquiry) and Application dependent formats (main link data mapping, time-base recovery equation for the receiver, and sink capability/stream attribute messages sub-packet formats, if applicable). The Application Profile Layer supports the following color formats 24-bit RGB, 16-bit RG2565, 18-bit RGB, 30-bit RGB, 256-color RGB (CLUT based), 16-bit, CbCr422, 20-bit YCbCr422, and 24-bit YCbCr444.

For example, the display device application profile layer (APL) 1914 is essentially an application-programming interface (API) describing the format for Stream Source/Sink communication over the main link 222 that includes a presentation format for data sent to or received from the interface 100. Since some aspects of the APL 1914 (such as the power management command format) are baseline monitor functions, they are common to all uses of the interface 100. Whereas other non-baseline monitor functions, such as such as data mapping format and stream attribute format, are unique to an application or a type of isochronous stream that is to be transmitted. Regardless of the application, the stream source 1904 queries the source link layer 1914 to ascertain whether the main link 222 is capable of handling the pending data stream(s) prior to the start any packet stream transmission on the main link 222.

When it is determined that the main link 222 is capable of supporting the pending packet stream(s), the stream source 1906 sends stream attributes to the source link layer 1914 that is then transmitted to the receiver over the auxiliary channel 224. These attributes are the information used by the receiver to identify the packets of a particular stream, to recover the original data from the stream and to format it back to the stream's native data rate. The attributes of the data stream are application dependent.

In those cases where the desired bandwidth is not available on the main link 222, the stream source 1914 may take corrective action by, for example, reducing the image refresh rate or color depth.

Display Device Physical Layer

Figure 22:
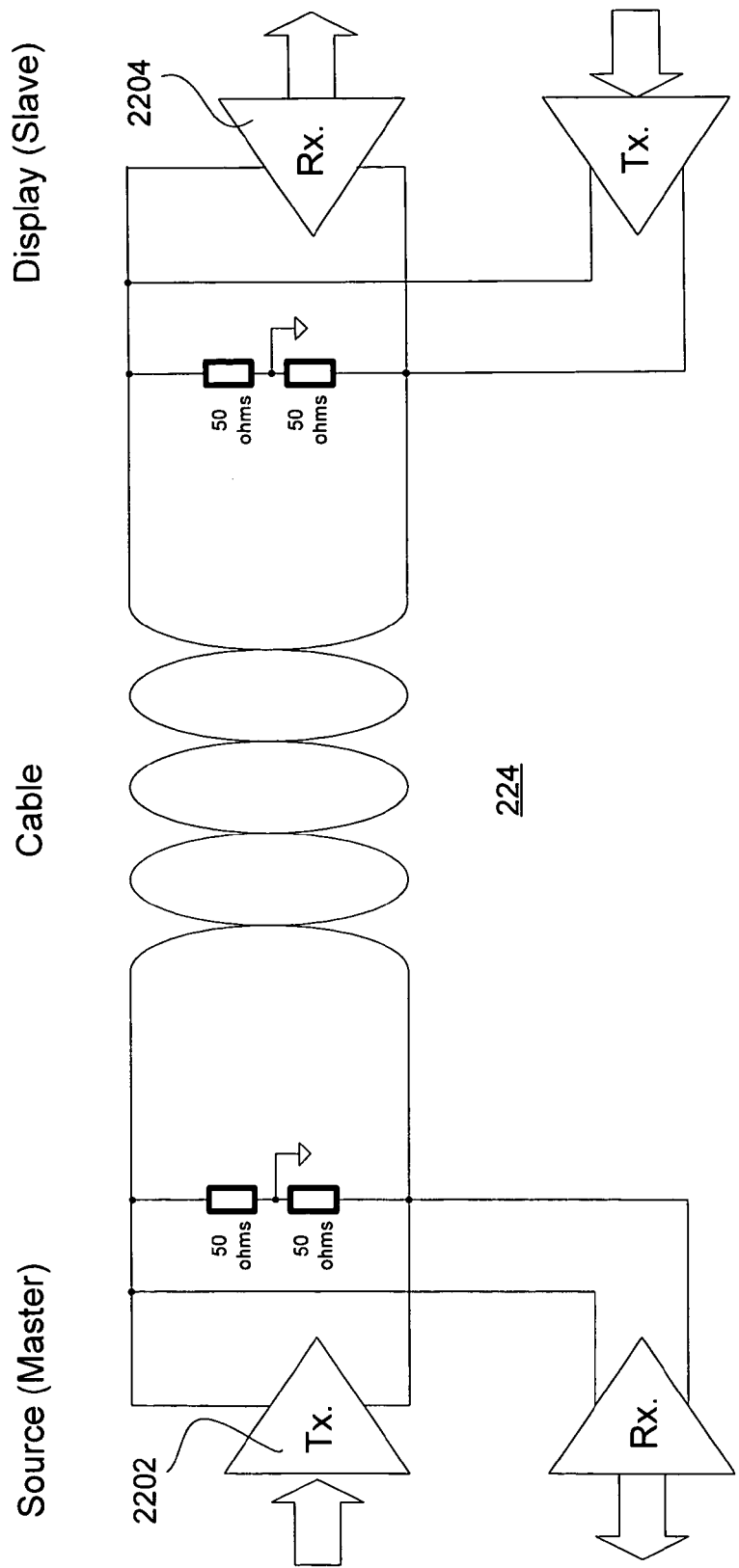
FIG. 22 shows a representative auxiliary channel electrical sub layer in accordance with an embodiment of the invention.
Figure 23:
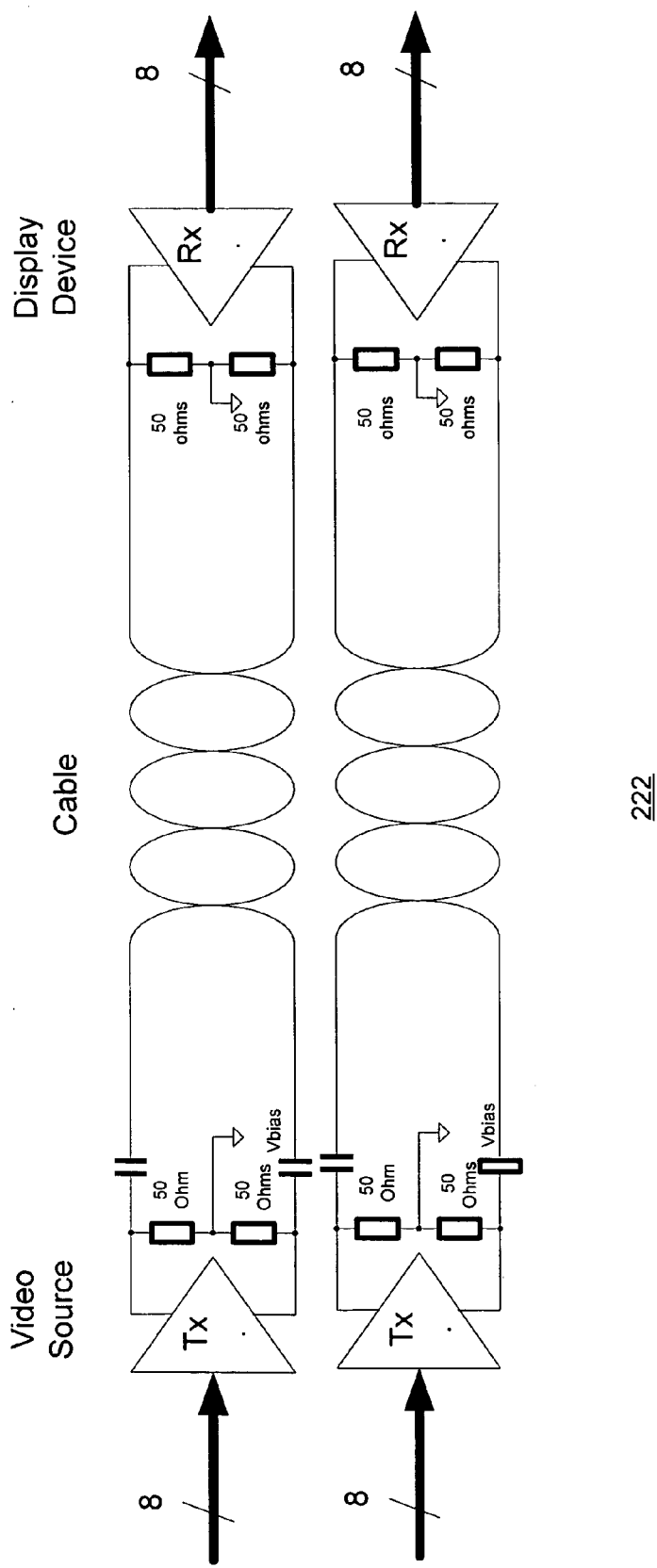
FIG. 23 shows a representative main link electrical sub layer in accordance with an embodiment of the invention.

The display device physical layer 1916 isolates the display device link layer 1910 and the display device APL 1916 from the signaling technology used for link data transmission/reception. The main link 222 and the auxiliary channel 224 have their own physical layers, each consisting of a logical sub layer and an electrical sub layer that includes the connector specification. For example, the half-duplex, bi-directional auxiliary channel 224 has both a transmitter and a receiver at each end of the link as shown in FIG. 22. An auxiliary link transmitter 2902 is provided with link characters by a logical sub layer 1908-1 that are then serialized serialized and transmitted to a corresponding auxiliary link receiver 2904. The receiver 2904, in turn, receives serialized link character from the auxiliary link 224 and de-serializes the data at a link character clock rate. It should be noted that the major functions of the source logical sub layers include signal encoding, packetizing, data scrambling (for EMI reduction), and training pattern generation for the transmitter port. While for the receiver port, the major functions of the receiver logical sub layer includes signal decoding, de-packetizing, data de-scrambling, and time-base recovery.

Auxiliary Channel

The major functions of auxiliary channel logical sub layer include data encoding and decoding, framing/de-framing of data and there are two options in auxiliary channel protocol: standalone protocol (limited to link setup/management functions in a point-to-point topology) is a lightweight protocol that can be managed by the Link Layer state-machine or firmware and extended protocol that supports other data types such as USB traffic and topologies such as daisy-chained sink devices. It should be noted that the data encoding and decoding scheme is identical regardless of the protocol whereas framing of data differs between the two.

Figure 29:
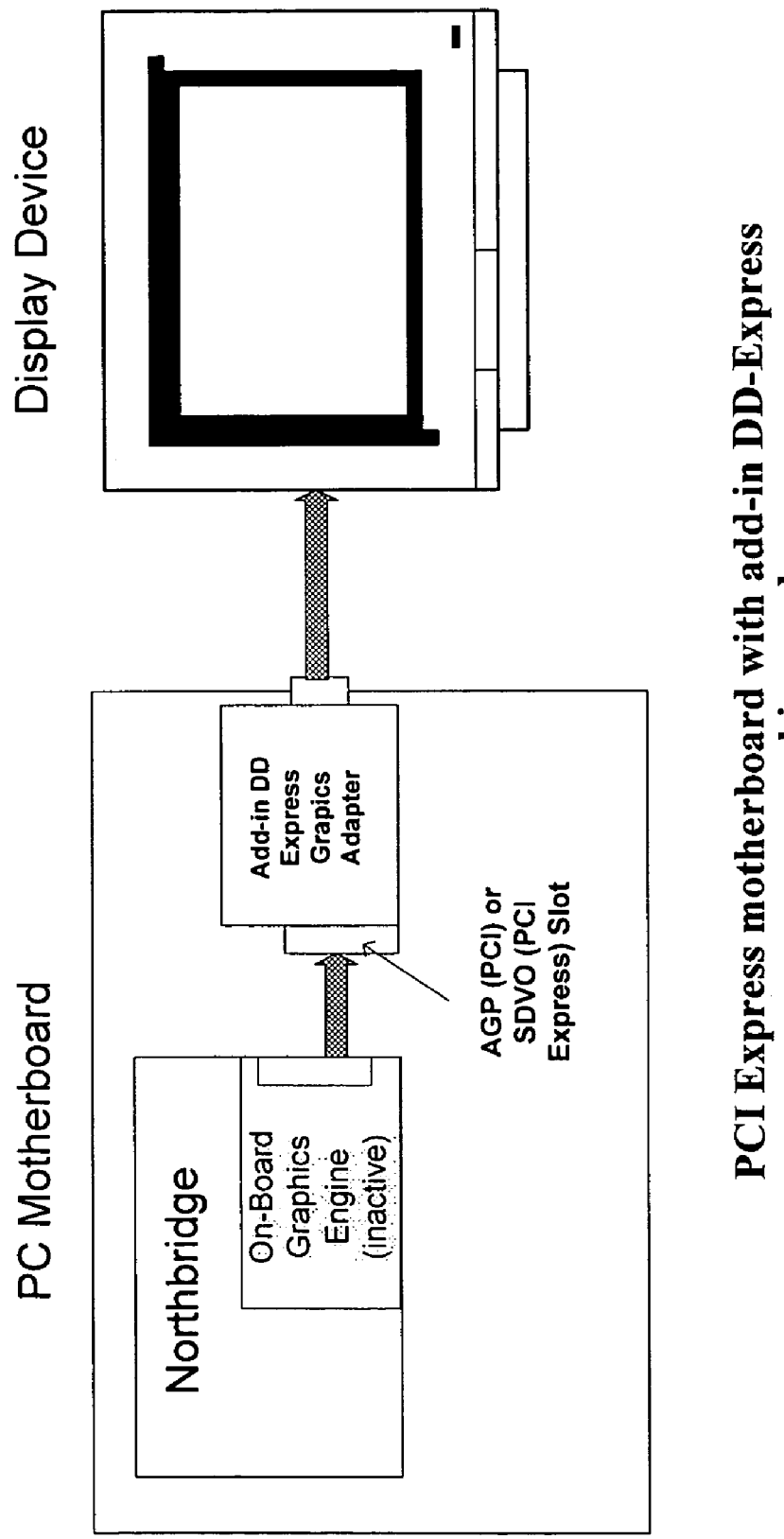

Still referring to FIG. 29, the auxiliary channel electrical sub layer contains the transmitter 2902 and the receiver 2904. The transmitter 2902 is provided with link characters by the logical sub layer, which it serializes and transmits out. The receiver 2904 receives serialized link character from the link layer and subsequently de-serializes it at link character clock rate. The positive and negative signals of auxiliary channel 224 are terminated to ground via 50-ohm termination resistors at each end of the link as shown. In the described implementation, the drive current is programmable depending on the link condition and ranges from approximately 8 mA to approximately 24 mA resulting in a range of Vdifferential_pp of approximately 400 mV to approximately 1.2V. In electrical idle modes, neither the positive nor the negative signal is driven. When starting transmission from the electrical idle state, the SYNC pattern must be transmitted and the link reestablished. In the described embodiment, the SYNC pattern consists of toggling a auxiliary channel differential pair signals at clock rate 28 times followed by four 1's in Manchester II code. The auxiliary channel master in the source device detects hot-plug and hot-unplug events by periodically driving or measuring the positive and negative signals of auxiliary channel 224.

Main Link

In the described embodiment, the main link 222 supports discrete, variable link rates that are integer multiples of the local crystal frequency (see FIG. 3 for a representative set of link rates consonant with a local crystal frequency of 24-MHz). As shown in FIG. 16, the main link 222 (being an unidirectional channel) has only a transmitter 1602 at the source device and only a receiver 1604 at the display device.

Figure 24:
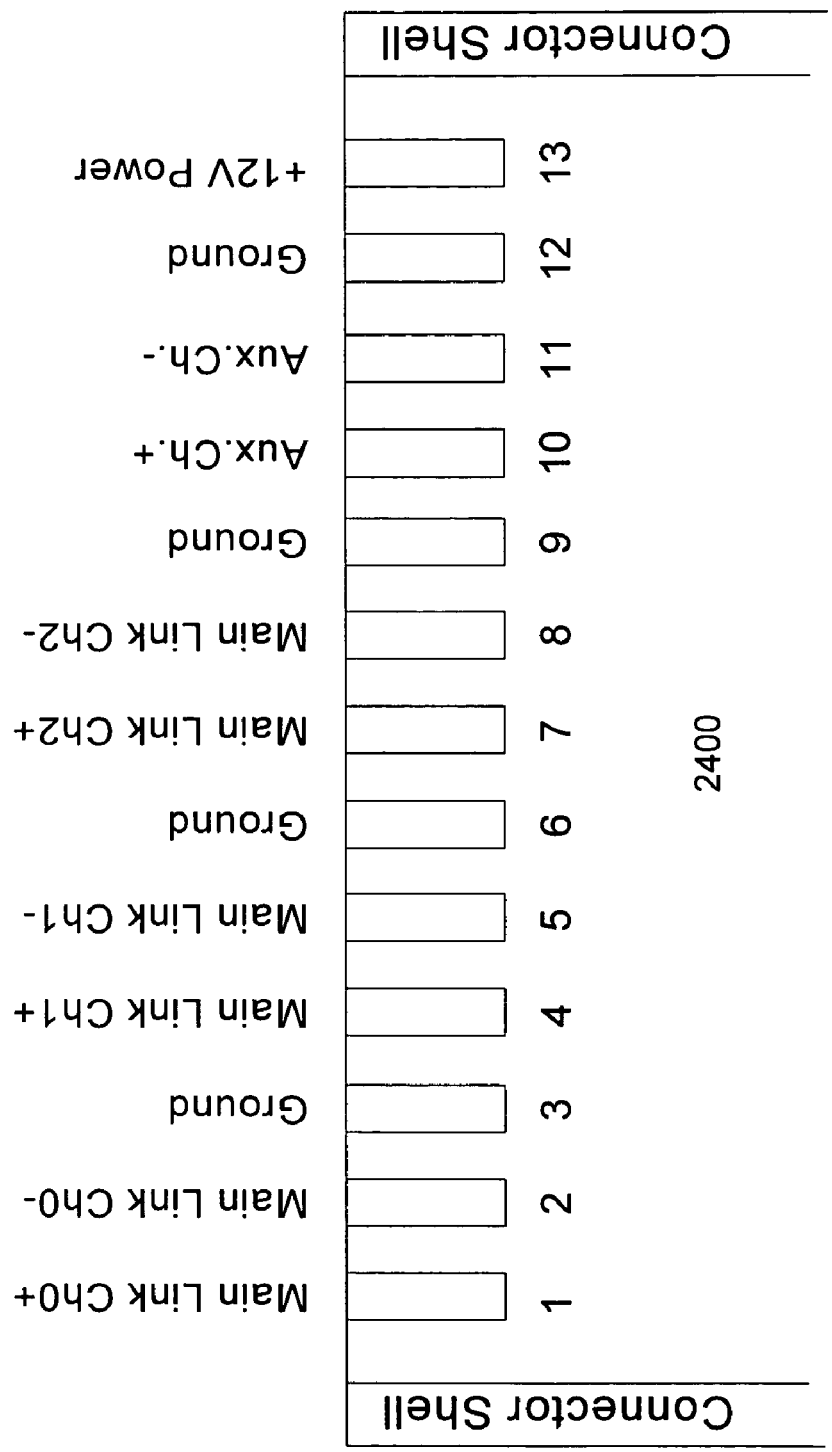
FIG. 24 shows a representative connector in accordance with an embodiment of the invention.

As shown, the cable 2304 takes the form includes a set of twisted pair wires, one for each of the Red (R), Green(G), and Blue(B) video signals provides in a typical RGB color based video system (such as PAL based TV systems). As known by those of skill in the art, twisted pair cable is a type of cable that consists of two independently insulated wires twisted around one another. One wire carries the signal while the other wire is grounded and absorbs signal interference. It should be noted that in some other systems, the signals could also be component based signals (Pb, Pr, Y) used for NTSC video TV systems. Within the cable, each twisted pair is individually shielded. Two pins for +12V power and ground are provided. The characteristics impedance of each differential pair is 100 ohms +/−20%. The entire cable is also shielded. This outer shield and individual shields are shorted to the connector shells on both ends. The connector shells are shorted to ground in a source device. A connector 2400 as shown in FIG. 24 has 13 pins in one row having a pinout that is identical both for the connector on the source device end and that on the display device end. The source device supplies the power.

The main link 222 is terminated on both ends and since the main link 222 is AC coupled, the termination voltage can be anywhere between 0V (ground) to +3.6V. In the described implementation, the drive current is programmable depending on the link condition and ranges from approximately 8 mA to approximately 24 mA resulting in a range of Vdifferential_pp of approximately 400 mV to approximately 1.2V. The minimum voltage swing is selected for each connection using a training pattern. An electrical idle state is provided for power management modes. In electrical idle, neither the positive nor the negative signals are driven. When starting a transmission from electrical idle state, the transmitter must conduct a training session in order re-establish the link with the receiver.

State Diagrams

Figure 25:
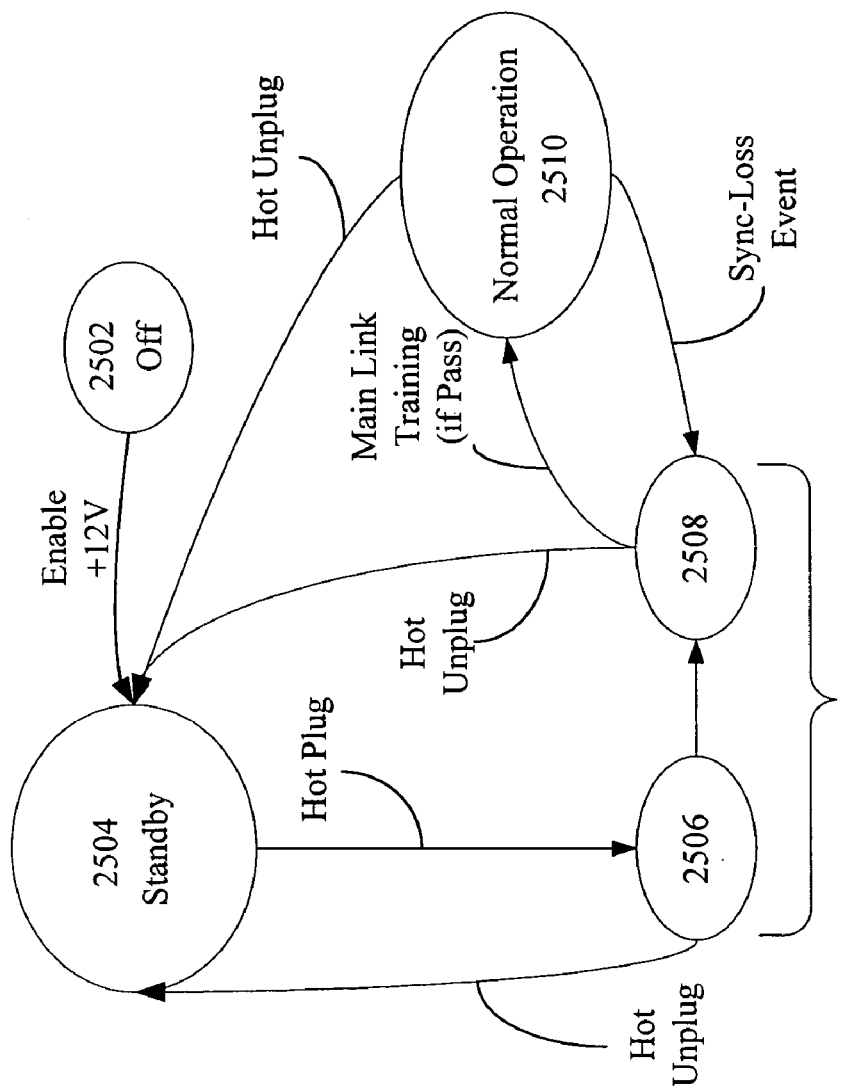
FIG. 25 shows a source state diagram in accordance with an embodiment of the invention.

The invention will now be described in terms of state diagrams shown in FIGS. 25 and 26 described below. Accordingly, FIG. 25 shows the source state diagram described below. At an off state 2502, the system is off such that the source is disabled. If the source is enabled, then the system transitions to a standby state 2504 suitable for power saving and receiver detection. In order to detect whether or not the receiver is present (i.e., hot plug/play), the auxiliary channel is periodically pulsed (such as for 1 us every 10 ms) and a measure of a voltage drop across the termination resistors during the driving is measured. If it is determined that a receiver is present based upon the measured voltage drop, then the system transitions to a detected receiver state 2506 indicating that a receiver has been detected, i.e, a hot plug event has been detected. If, however, there is no receiver detected, then the receiver detection is continued until such time, if ever, a receiver is detected or a timeout has elapsed. It should be noted that in some cases the source device may choose to go to "OFF" state from which no further display detection is attempted.

If at the state 2506 a display hot unplug event is detected, then the system transitions back to the standby state 2504. Otherwise the source drives the auxiliary channel with a positive and negative signal to wake up receiver and the receiver's subsequent response, if any, is checked. If there is no response received, then the receiver has not woken up and source remains in the state 2506. If, however, a signal is received from the display, then the display has woken up and the source is ready read the receiver link capabilities (such as max link rate, buffer size, and number of time-base recovery units) and the system transitions to a main link initialization state 2508 and is ready to commence a training start notification phase.

At this point, a training session is started by sending a training pattern over the main link at a set link rate and checks an associated training status. The receiver sets a pass/fail bit for each of three phases and the transmitter will proceed to the next phase upon detection of pass only such that when a pass is detected, the main link is ready at that link rate. At this point, the interface transitions to a normal operation state 2210, otherwise, the link rate is reduced and the training session is repeated. During the normal operation state 2510, the source continues to periodically monitor a link status index, which if fails, a hot unplug event is detected and the system transitions to the standby state 2504 and waits for a hot plug detection event. If, however, a sync loss is detected, then the system transitions to state 2508 for a main link re-initiation event.

Figure 26:
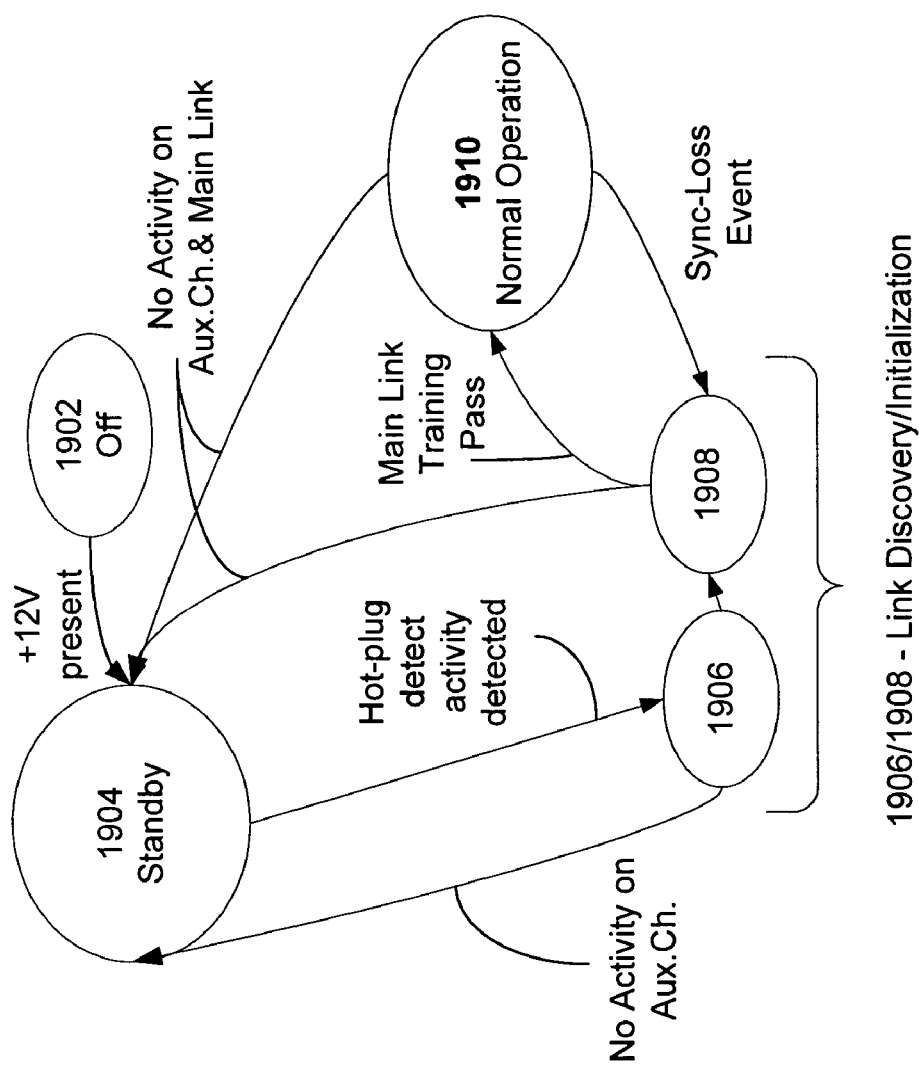
FIG. 26 shows a display state diagram in accordance with an embodiment of the invention.

FIG. 26 shows the display state diagram 2600 described below. At a state 2602, no voltage is detected, the display goes to an OFF state. At a standby mode state 2604, both main link receiver and auxiliary channel slave are in electrical idle, a voltage drop across the termination resistors of auxiliary channel slave port are monitored for a predetermined voltage. If the voltage is detected, then the auxiliary channel slave port is turned on indicating a hot plug event and the system moves to a display state 2606, otherwise, the display remains in the standby state 2604. At the state 2606 (main link initialization phase), if a display is detected, then the auxiliary slave port is fully turned on, and the transmitter responds to a receiver link capability read command and the display state transitions to 2608, otherwise, if there is no activity on the auxiliary channel for more than a predetermined period of time then the auxiliary channel slave port is put into the to standby state 2604.

During a training start notification phase, the display responds to the training initiation by the transmitter by adjusting the equalizer using training patterns, updating the result for each phase. If the training fails, then wait for another training session and if the training passes, then go to normal operation state 2610. If there is no activity on the auxiliary channel or on the main link (for training) for more than a predetermined (10 ms, for example), the auxiliary channel slave port is set to the standby state 2604.

FIGS. 27-31 show particular implementations of the cross platform display interface.

Figure 27:
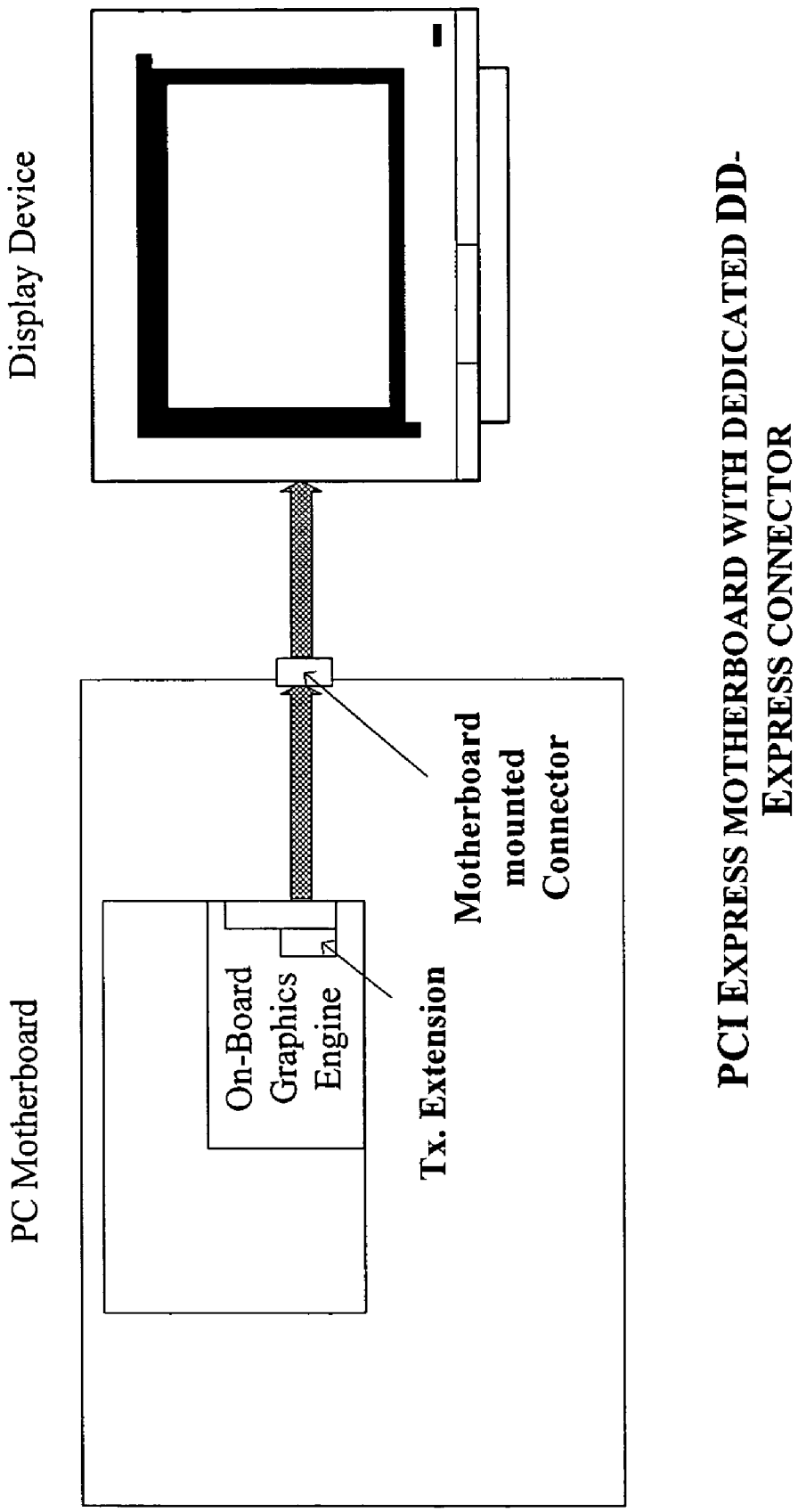
FIGS. 27-31 illustrate various computer based implementations of the invention.

FIG. 27 shows a PC motherboard 2000 having an on-board graphics engine 2002 that incorporates a transmitter 2704 in accordance with the invention. It should be noted that the transmitter 2704 is a particular example of the transmitter 102 shown in FIG. 1. In the described embodiment, the transmitter 2704 is coupled to an connector 2706 (along the lines of the connector 2400) mounted on the motherboard 2000 which in turn is connected to a display device 2708 by way of a twisted pair cable 2710 couples a display device 2710.

As known in the art, PCI Express (developed by Intel Corporation of Santa Clara, Calif.) is a high-bandwidth, low pin count, serial, interconnect technology that also maintains software compatibility with existing PCI infrastructure. In this configuration, the PCI Express port is augmented to become compliant with the requirements of the cross platform interface which can directly drive a display device either using a motherboard mounted connector as shown.

Figure 28:
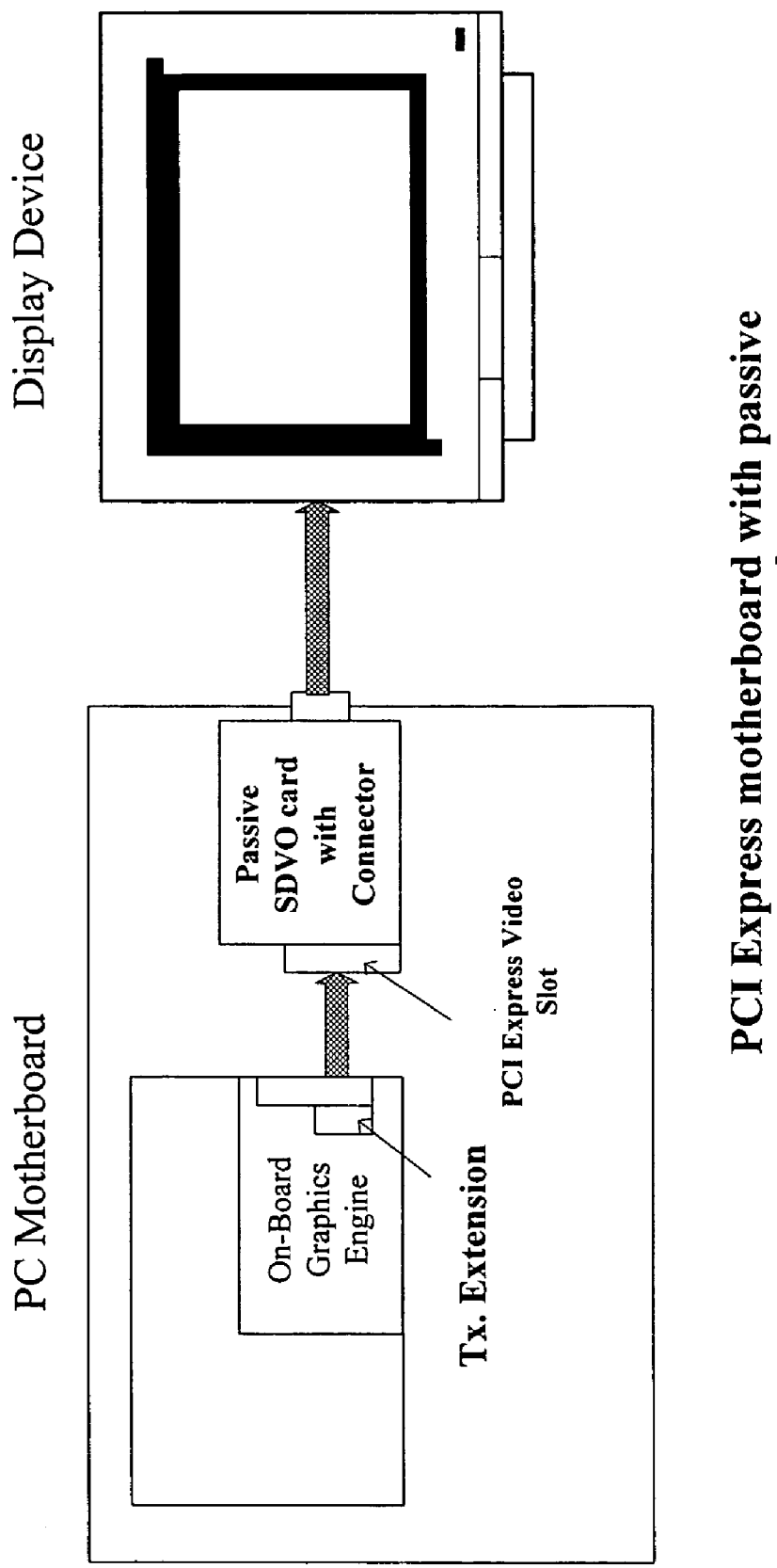
Figure 30:
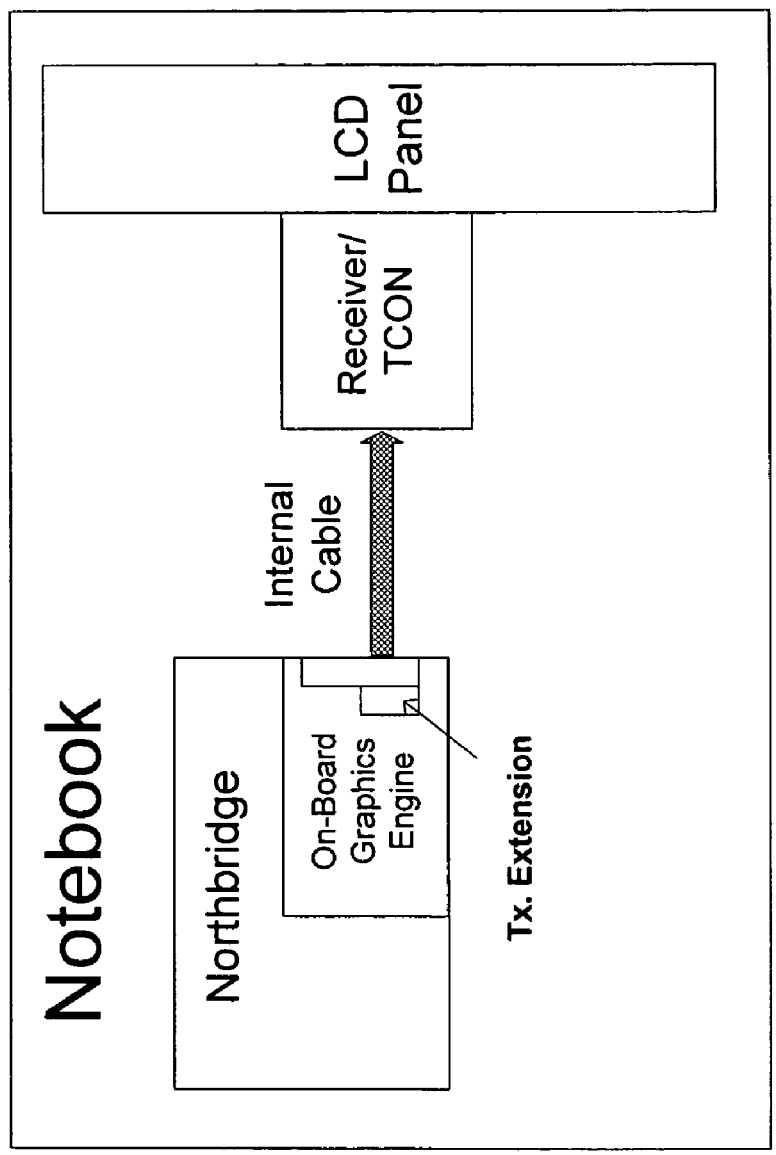

In situations where it is not practical to mount the connector on the motherboard, the signals can be routed through the SDVO slot of the PCI Express motherboard and brought to the back of the PC using a passive card connector as shown in FIG. 28. As is the case with the current generation of add-in graphics cards, a add-in graphics card can supplant the onboard graphics engine as shown in FIG. 30.

Figure 31:
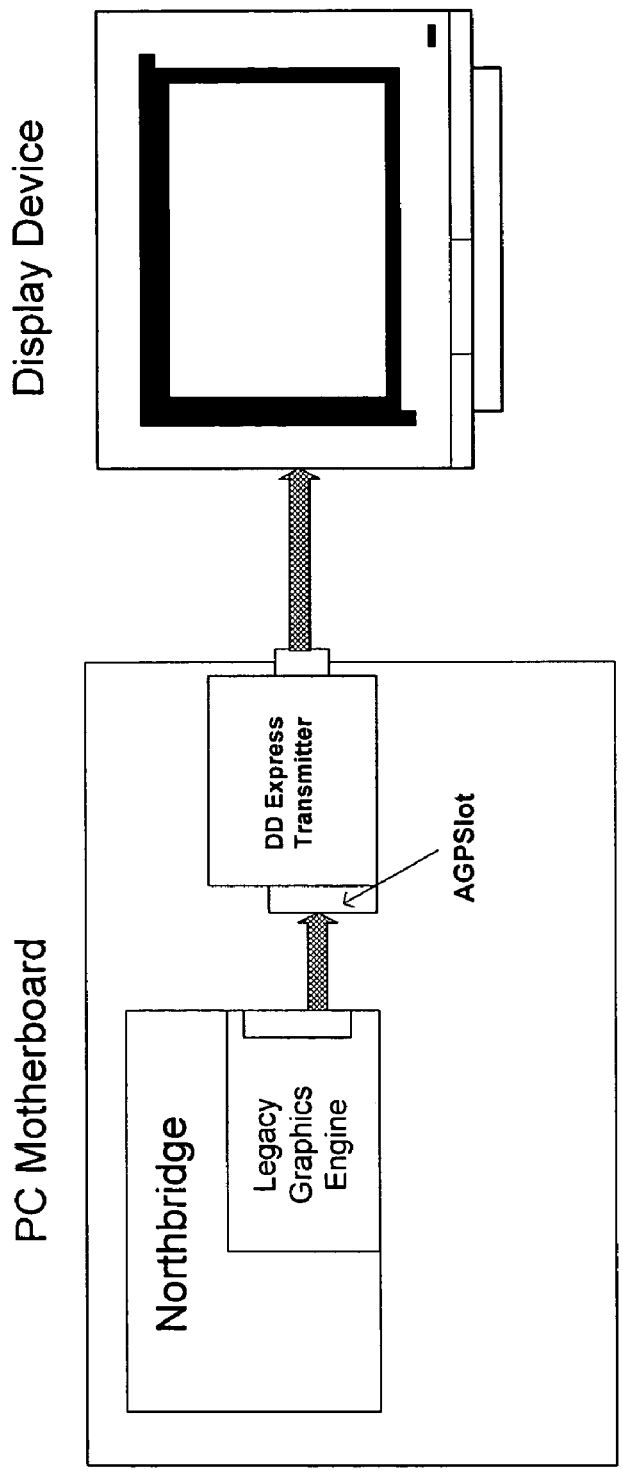

In the case of notebook applications, the transmitter on the motherboard graphics engine would drive through internal cabling, an integrated receiver/TCON which would drive the panel directly. For the most cost effective implementation, the receiver/TCON would be mounted on the panel thereby reducing the number of interconnect wires to 8 or 10 as shown in FIG. 31.

All of the above examples assume integrated transmitters. However, is it quite feasible to implement as a standalone transmitter integrating into PCI and PCI Express environments through the AGP or SDVO slots, respectively. A standalone transmitter will enable output streams without any change in graphics hardware or software.

Flowchart Embodiments

The methodology of the invention will now be described in terms of a number of flowcharts each describing a particular process for enabling the invention. Specifically, FIGS. 32-36 describe a number of interrelated processes that when used singly or in any combination described aspects of the invention.

Figure 32:
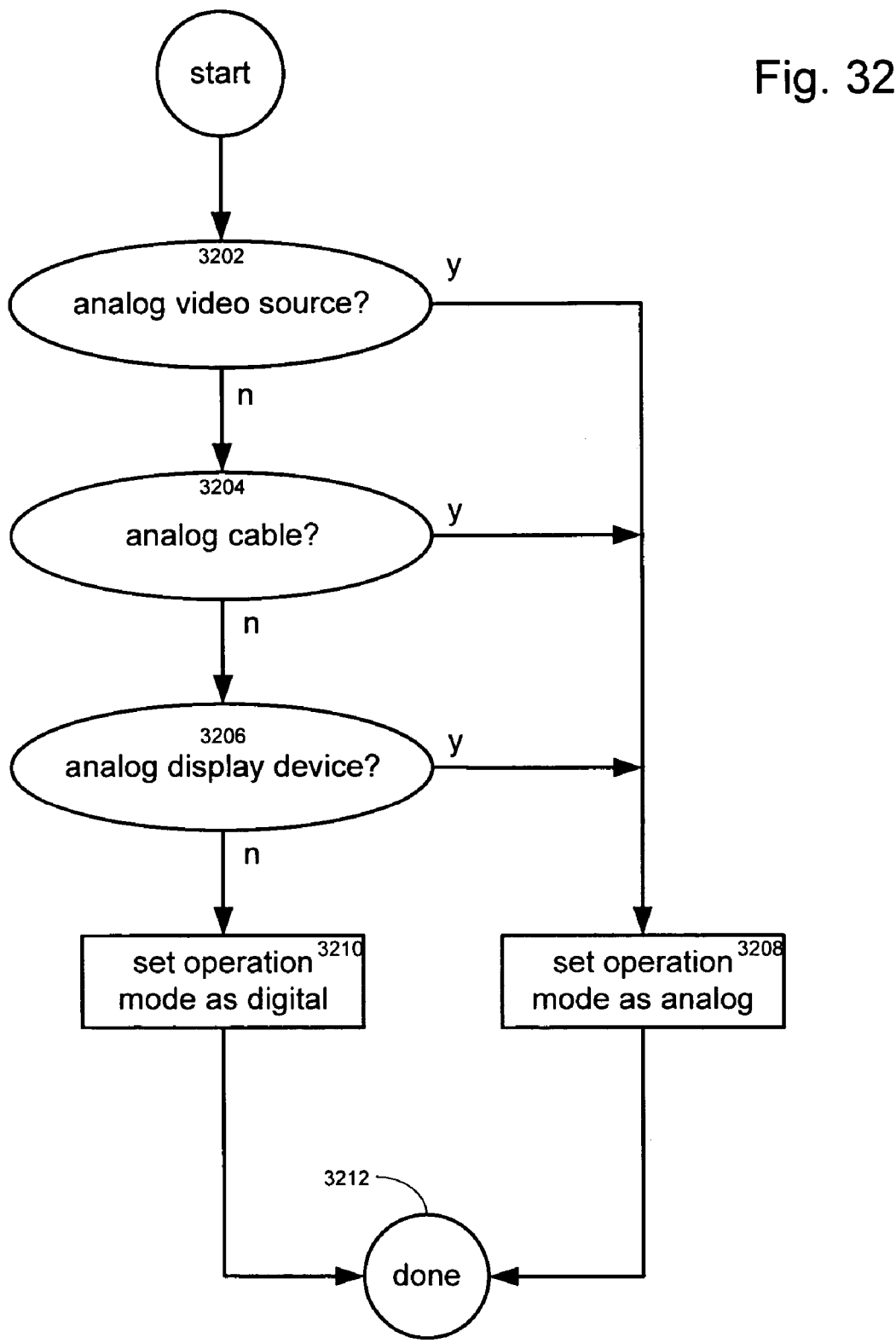
FIG. 32 shows a flowchart detailing a process for determining an operational mode of the interface in accordance with an embodiment of the invention.

FIG. 32 shows a flowchart detailing a process 3200 for determining an operational mode of the interface 100 in accordance with an embodiment of the invention. In this process, the operational mode will only be set to a digital mode if the video source and the display device are both digital. Otherwise, the operational mode will be set to analog mode. It should be noted that "analog mode" in this context can include both conventional VGA mode as well as enhanced analog mode having differential analog video with embedded alignment signal and bidirectional sideband. This enhanced analog mode will be described below.

In step 3202, a video source is interrogated to determine whether the video source supports analog or digital data. If the video source supports only analog data, the operational mode of coupling device 100 will be set to analog (step 3208), then the process will end (step 3212).

If the video source can output digital data, the process continues to step 3206. The display device is then interrogated to determine whether the display device is configured to receive digital data. If the display device supports only analog data, the operational mode of coupling device will be set to analog (step 3208), then the process will end (step 3212). Otherwise, the operational mode of the coupling device is set to digital (step 3210). For example, a processor may control switches within the coupling device to set the mode to digital. In general, the coupling device is configured to operate in a fully digital mode only when both the video source and the video sink are operating in a corresponding digital mode.

Figure 33:
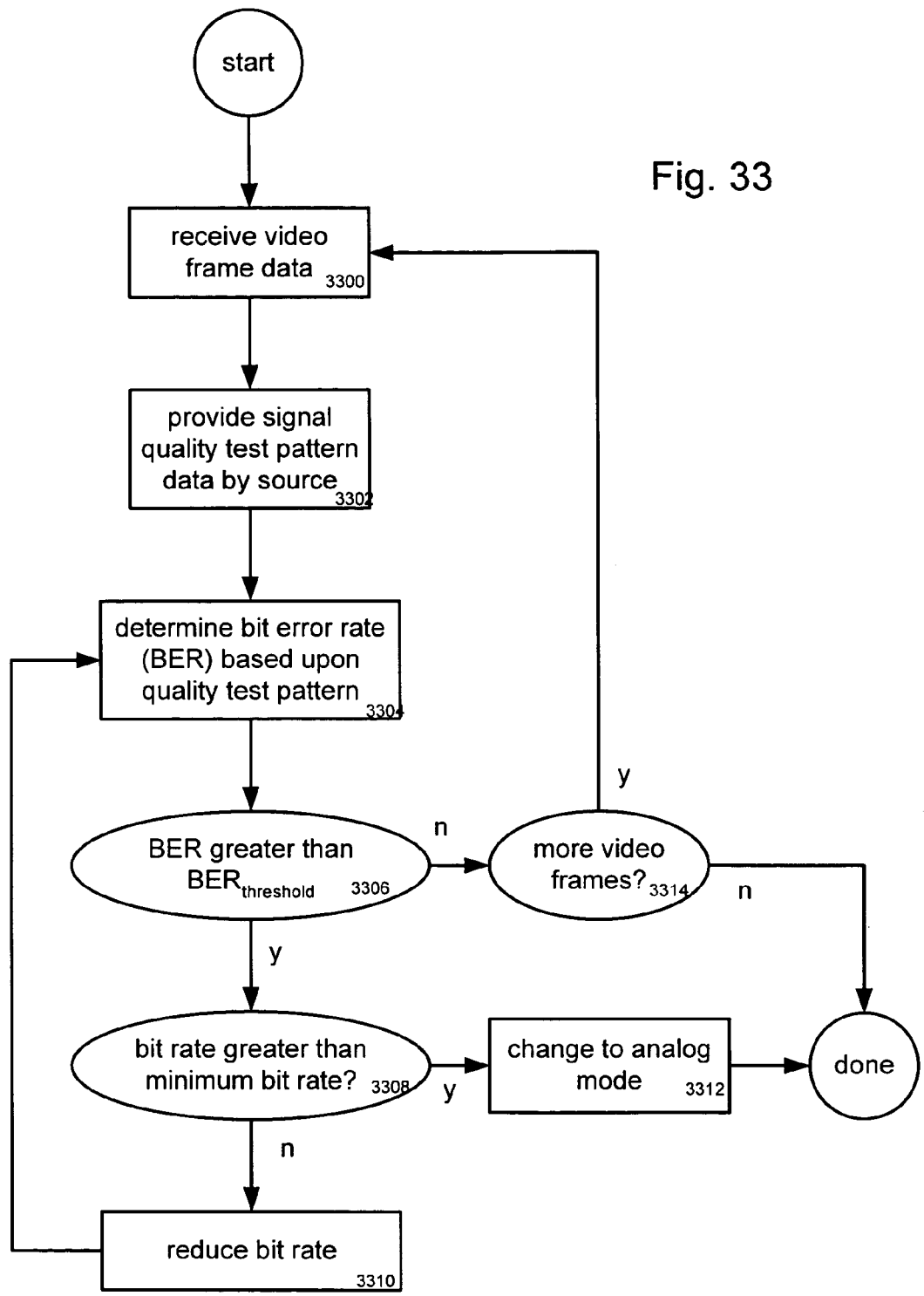
FIG. 33 shows a flowchart detailing a process for providing a real time video image quality check in accordance with some aspects of the invention.

FIG. 33 shows a flowchart detailing a process 3300 for providing a real time video image quality check in accordance with some aspects of the invention. In this example, all determinations of process 3300 are made by a processor coupled to the display interface.

In step 3300, a video signal is received from a video source. Next, a signal quality test pattern is provided by the video source associated with the received video signal (step 3302). In step 3304, a determination of a bit error rate is made, based upon the quality test pattern. Then, a determination is made of whether the bit error rate is greater than a threshold value (step 3306). If the bit error rate is determined to not be greater than the threshold value, then a determination is made (step 3314) of whether or not there are more video frames. If it is determined that there are more video frames, then the process returns to step 3300. Otherwise, the process ends.

However, if the bit error rate is determined to be greater than the threshold value in step 3306, a determination is made (step 3308) as to whether the bit rate is greater than a minimum bit rate. If the bit rate is greater than a minimum bit rate, then the bit rate is lowered (step 3310) and the process returns to step 3306. If the bit rate is not greater than the minimum bit rate, then the mode is changed to analog mode (step 3312) and the process ends.

Figure 34A:
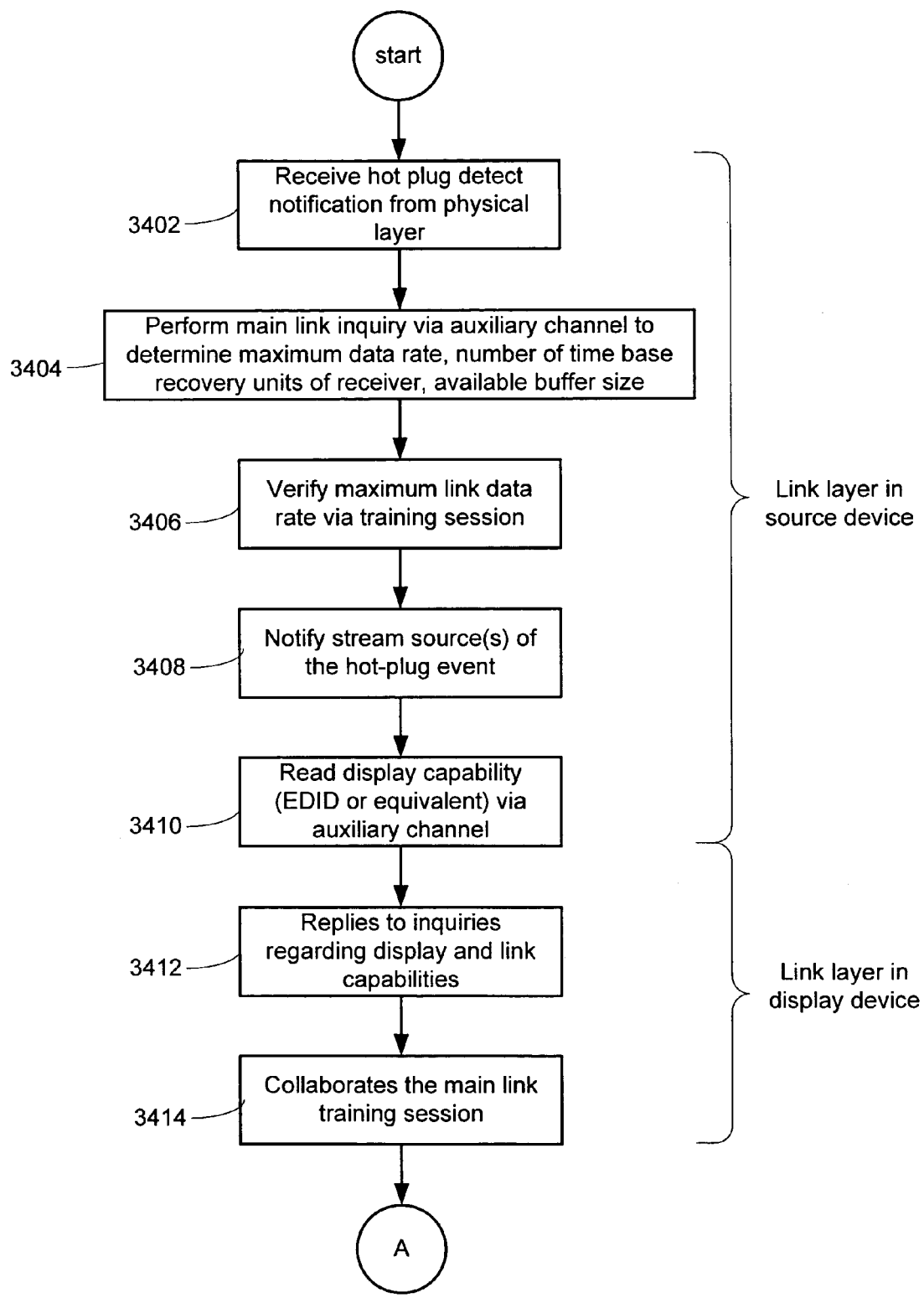
FIGS. 34A and 34B show a flowchart for a link set up process in accordance with an embodiment of the invention.
Figure 34B:
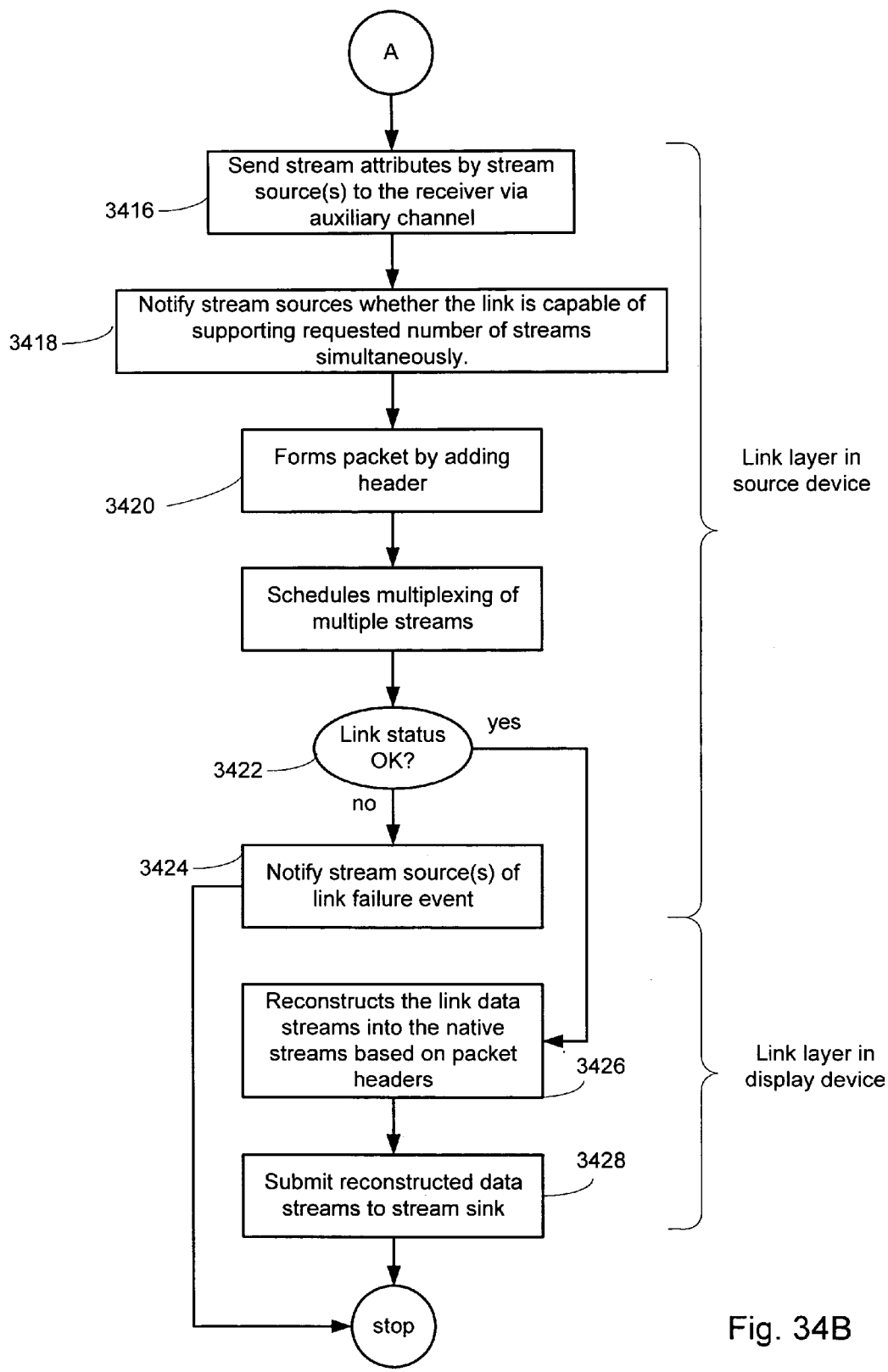

FIG. 34 shows a flowchart for a link set up process 3400 in accordance with an embodiment of the invention. The process 3400 begins at 3402 by the receiving of a hot plug detection event notification. At 3404 a main link inquiry is made by way of an associated auxiliary channel to determine a maximum data rate, a number of time base recovery units included in a receiver, and available buffer size. Next, at 3406, the maximum link data rate is verified by way of a training session and at 3408, a data stream source is notified of the hot plug event. At 3410, the capabilities of the display (using EDID, for example) are determined by way of the auxiliary channel and the display responds to the inquires at 3412 which, in turn, results a collaboration of the main link training session at 3414.

Next, at 3416, the stream source sends stream attributes to the receiver by way of the auxiliary channel and at 3418, the stream sources are further notified whether the main link is capable of supporting the requested number of data streams at 3420. At 3422, the various data packets are formed by adding associated packet headers and the multiplexing of a number of source streams is scheduled at 3424. At 3426 a determination is made whether or not the link status is OK. When the link status is not OK, then the source(s) are notified of a link failure event at 3428, otherwise, the link data streams are reconstructed into the native streams based upon the various packet headers at 3430. At 3432, the reconstructed native data streams are then passed to the display device.

Figure 35:
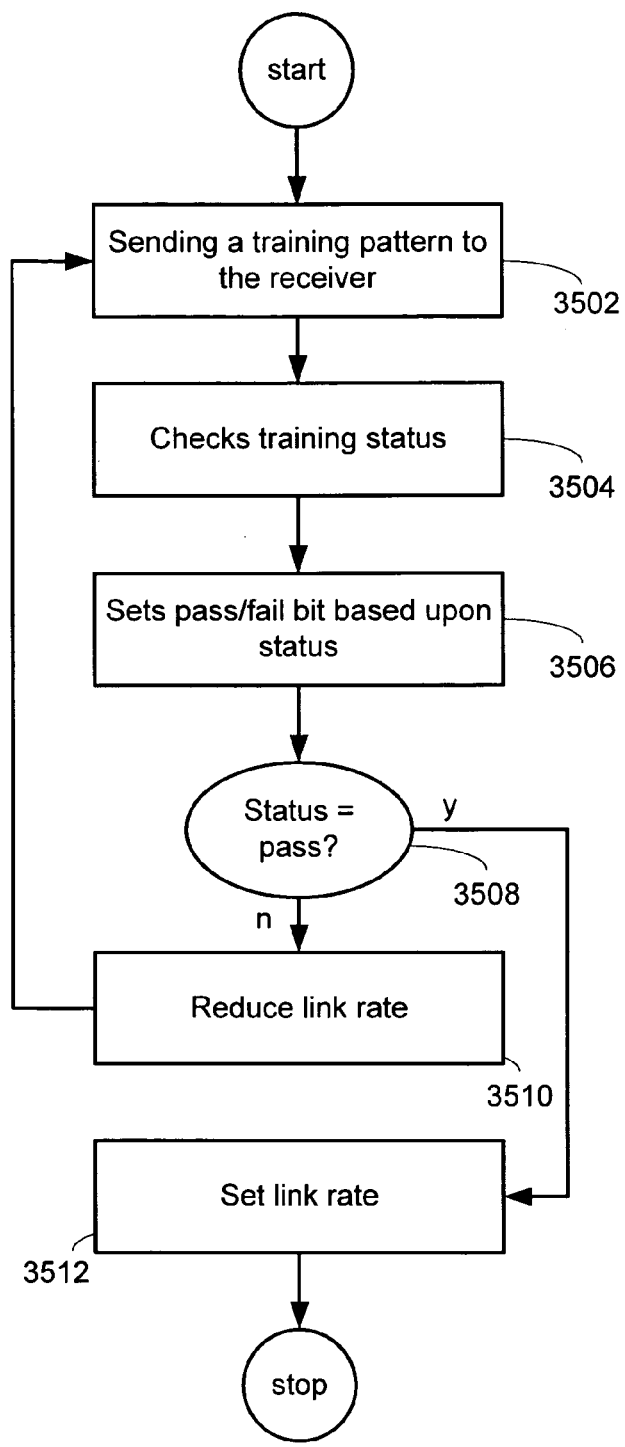
FIG. 35 shows a flowchart detailing a process for performing a training session in accordance with an embodiment of the invention.

FIG. 35 shows a flowchart detailing a process 3500 for performing a training session in accordance with an embodiment of the invention. It should be noted that the training session process 3500 is one implementation of the operation 3206 described in FIG. 32. A training session is started at 3502 by sending a training pattern over the main link at a set link rate to the receiver. A typical link training pattern is shown in FIG. 11 in accordance with an embodiment of the invention. As illustrated, during the training session, a phase 1 represents the shortest run length while phase 2 is the longest. The receiver is to use these two phases to optimize the equalizer. In phase 3, both bit lock and character lock are achieved as long as the link quality is reasonable. At 3504, the receiver checks an associated training status and based upon the training status check, the receiver sets a pass/fail bit for each of three phases and the transmitter at 3506. At each phase, the receiver will proceed to the next phase upon detection of pass only and at 3510 and if the receiver does not detect a pass then the receiver reduces the link rate and repeats the training session. The main link is ready at that link rate at which a pass is detected at 3512.

Figure 36:
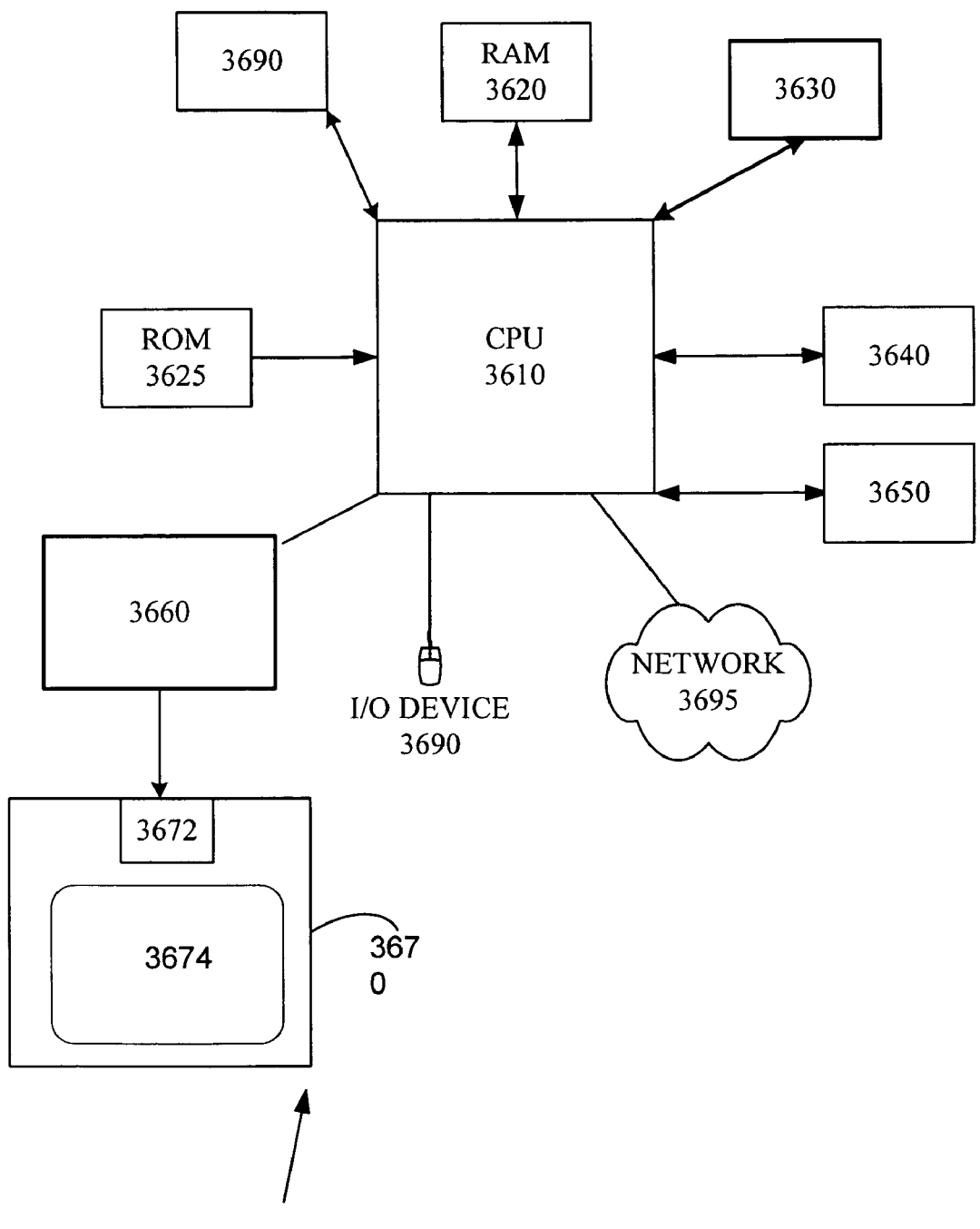
FIG. 36 illustrates a computer system employed to implement the invention.

FIG. 36 illustrates a computer system 3600 employed to implement the invention. Computer system 3600 is only an example of a graphics system in which the present invention can be implemented. Computer system 3600 includes central processing unit (CPU) 3610, random access memory (RAM) 3620, read only memory (ROM) 3625, one or more peripherals 3630, graphics controller 3660, primary storage devices 3640 and 3650, and digital display unit 3670. As is well known in the art, ROM acts to transfer data and instructions uni-directionally to the CPUs 3610, while RAM is used typically to transfer data and instructions in a bi-directional manner. CPUs 3610 may generally include any number of processors. Both primary storage devices 3640 and 3650 may include any suitable computer-readable media. A secondary storage medium 880, which is typically a mass memory device, is also coupled bi-directionally to CPUs 3610 and provides additional data storage capacity. The mass memory device 880 is a computer-readable medium that may be used to store programs including computer code, data, and the like. Typically, mass memory device 880 is a storage medium such as a hard disk or a tape which generally slower than primary storage devices 3640, 3650. Mass memory storage device 880 may take the form of a magnetic or paper tape reader or some other well-known device. It will be appreciated that the information retained within the mass memory device 880, may, in appropriate cases, be incorporated in standard fashion as part of RAM 3620 as virtual memory.

CPUs 3610 are also coupled to one or more input/output devices 890 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 3610 optionally may be coupled to a computer or telecommunications network, e.g., an Internet network or an intranet network, using a network connection as shown generally at 3695. With such a network connection, it is contemplated that the CPUs 3610 might receive information from the network, or might output information to the network in the course of performing the above-described method steps. Such information, which is often represented as a sequence of instructions to be executed using CPUs 3610, may be received from and outputted to the network, for example, in the form of a computer data signal embodied in a carrier wave. The above-described devices and materials will be familiar to those of skill in the computer hardware and software arts.

Graphics controller 3660 generates analog image data and a corresponding reference signal, and provides both to digital display unit 3670. The analog image data can be generated, for example, based on pixel data received from CPU 3610 or from an external encode (not shown). In one embodiment, the analog image data is provided in RGB format and the reference signal includes the VSYNC and HSYNC signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

I claim:

1. A packet based display interface arranged to couple a multimedia source device to a multimedia sink device, comprising:

a transmitter unit coupled to the source device arranged to receive a source packet data stream in accordance with a native stream rate;

a receiver unit coupled to the sink device;

a linking unit coupling the transmitter unit and the receiver unit arranged to transfer a multimedia data packet stream formed of a number of multimedia data packets based upon the source packet data stream in accordance with a link rate that is independent of the native stream rate between the transmitter unit and the receiver unit; wherein the linking unit does not include a clock line; and a data packet scheduler unit coupled to the linking unit arranged to schedule data packets for transport over the linking unit for the selected ones of the data streams wherein the data packet size for each data stream is an associated fixed size that depends upon a ratio between a data stream bit rate and a link bit rate.

2. A display interface as recited in claim 1, wherein the multimedia data packet stream is one of a number of multimedia data packet streams each having an associated adjustable data stream link rate that is independent of the native stream rate.

3. A display interface as recited in claim 1, wherein the link unit further comprises:

a unidirectional main link arranged to carry the multimedia data packets from the transmitter unit to the receiver unit; and a bi-directional auxiliary channel arranged to transfer information between the transmitter unit and the receiver unit and vice versa.

4. A display interface as recited in claim 3, wherein the bi-directional auxiliary channel is formed of a uni-directional back channel configured to carry information from the sink device to the source device and a uni-directional forward channel included as part of the main channel for carrying information from the source device to the sink device in concert with the back channel.

5. A display interface as recited in claim 2, wherein the main link unit further comprises:

a number of virtual links each being associated with a particular one of the multi media data packet streams wherein each of said virtual links has an associated virtual link bandwidth and a virtual link rate.

6. A display interface as recited in claim 5, wherein a main link bandwidth is at least equal to an aggregate of the virtual link bandwidths.

7. A method of coupling a multimedia source device to a multimedia sink device, comprising:

providing a source device having a transmitter unit coupled thereto;

providing sink device having a receiver unit coupled thereto;

receiving a source data stream in accordance with a native stream rate by the transmitter unit;

coupling the transmitter unit and the receiver unit by way of a linking unit, wherein the linking unit does not include a clock line;

forming a multimedia data packet stream formed of a number of multimedia data packets;

generating a transport schedule for transferring the multimedia data packet stream in accordance with a link rate that is independent of the native stream rate between the transmitter unit and the receiver unit wherein the data packet size for each data stream is an associated fixed size that depends upon a ratio between a data packet stream bit rate and the link bit rate.

8. A method as recited in claim 7, further comprising:

providing a unidirectional main link arranged to carry the multimedia data packets from the transmitter unit to the receiver unit; and providing a bi-directional auxiliary channel arranged to transfer information between the transmitter unit and the receiver unit and vice versa.

9. A method as recited in claim 8, wherein the bi-directional auxiliary channel is formed of a unidirectional back channel configured to carry information from the sink device to the source device and a uni-directional forward channel included as part of the main channel for carrying information from the source device to the sink device in concert with the back channel.

10. A method as recited in claim 9, wherein the main link unit further comprises:

a number of virtual links each being associated with a particular one of the multi media data packet streams wherein each of said virtual links has an associated virtual link bandwidth and a virtual link rate.

11. A method as recited in claim 10, wherein a main link bandwidth is at least equal to an aggregate of the virtual link bandwidths.

12. A method of scheduling a transport of a number of data packets between a data source and a data sink by way of a data link, wherein the data packetes are received at the data source at a native stream rate, comprising:

sending data packet attributes from the data packet source to the data packet sink;

comparing a stream bit rate to a data link bit rate for each of a number of data streams to be sent from the source to the sink;

setting a packet size for each of the data streams based upon the comparing wherein the packet size is a fixed packet size;

combining at least one of each data packet;

generating a transport schedule for transferring the data packets in accordance with a link rate that is independent of the native stream rate between the data source and the data sink; and transporting the combined data packets from the source to the sink in accordance with the transport schedule, wherein the data link does not include a clock line.

13. Computer program product stored on a computer-readable medium wherein the propram product instructions are executable for scheduling a transport of a number of data packets between a data source and a data sink by way of a data link, comprising: computer code for sending data packet attributes from the data packet source to the data packet sink; computer code for comparing a stream bit rate to a data link bit rate for each of a number of data streams to be sent from the source to the sink; computer code for setting a packet size for each of the data streams based upon the comparing wherein the packet size is a fixed packet size;

computer code for combining at least one of each data packet; computer code for generating a transport schedule for transferring the data packets in accordance with a link rate that is independent of the native stream rate between the data source and the data sink; computer code for transporting the combined data packets from the source to the sink in accordance with the transport schedule, wherein the data link does not include a clock line; and computer readable medium for storing the code.

14. Computer program product stored on a computer-readable medium wherein the program product instructions are executable for coupling a multimedia source device to a multimedia sink device, comprising: providing a source device having a transmitter unit coupled thereto; providing sink device having a receiver unit coupled thereto; receiving a source data stream in accordance with a native stream rate by the transmitter unit; coupling the transmitter unit and the receiver unit by way of a linking unit, wherein the linking unit does not include a clock line; forming a multimedia data packet stream formed of a number of multimedia data packets; generating a transport schedule for transferring the multimedia data packet stream in accordance with a link rate that is independent of the native stream rate between the transmitter unit and the receiver unit wherein the data packet size for each data stream is an associated fixed size that depends upon a ratio between a data packet stream bit rate and the link bit rate.

15. Computer program product as recited in claim 14, further comprising:
   providing a unidirectional main link affanged to carry the multimedia data packets from the transmitter unit to the receiver unit; and
   providing a bi-directional auxiliary channel arranged to transfer information between the transmitter unit and the receiver unit and vice versa.

16. Computer program product as recited in claim 15, wherein the bi-directional auxiliary channel is formed of a uni-directional back channel configured to carry information from the sink device to the source device and a uni-directional forward channel included as part of the main channel for carrying information from the source device to the sink device in concert with the back channel.

17. Computer program product as recited in claim 16, wherein the main link unit further comprises:
   a number of virtual links each being associated with a particular one of the multi media data packet streams wherein each of said virtual links has an associated virtual link bandwidth and a virtual link rate.

18. Computer program product as recited in claim 17, wherein a main link bandwidth is at least equal to an aggregate of the virtual link bandwidths.

* * * * *